United States Patent
Nakano

(10) Patent No.: US 11,941,796 B2
(45) Date of Patent: Mar. 26, 2024

(54) EVALUATION SYSTEM, EVALUATION DEVICE, EVALUATION METHOD, EVALUATION PROGRAM, AND RECORDING MEDIUM

(71) Applicant: SINTOKOGIO, LTD., Nagoya (JP)

(72) Inventor: Yoshinari Nakano, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 555 days.

(21) Appl. No.: 16/968,680

(22) PCT Filed: Oct. 4, 2018

(86) PCT No.: PCT/JP2018/037250
§ 371 (c)(1),
(2) Date: Aug. 10, 2020

(87) PCT Pub. No.: WO2019/159424
PCT Pub. Date: Aug. 22, 2019

(65) Prior Publication Data
US 2021/0004947 A1   Jan. 7, 2021

(30) Foreign Application Priority Data

Feb. 16, 2018 (JP) ................................ 2018-026097

(51) Int. Cl.
*G06T 7/00* (2017.01)
*G06N 3/08* (2023.01)
(Continued)

(52) U.S. Cl.
CPC ............ *G06T 7/0006* (2013.01); *G06N 3/08* (2013.01); *G06T 5/001* (2013.01); *G06T 7/001* (2013.01);
(Continued)

(58) Field of Classification Search
CPC ..... G06T 7/0002; G06T 7/0004; G06T 7/001; G06T 5/001; G06T 7/90;
(Continued)

(56) References Cited

U.S. PATENT DOCUMENTS 5,293,320 A   3/1994   Thompson et al.
5,581,483 A   12/1996  Thompson et al.
(Continued)

FOREIGN PATENT DOCUMENTS

CN    203221418 U    10/2013
CN    104451079 A    3/2015
(Continued)

OTHER PUBLICATIONS

A. Blug, P. Strohm, D. Carl, H. Höfler, B. Blug and A. Kailer, "On the potential of current CNN cameras for industrial surface inspection," 2012 13th International Workshop on Cellular Nanoscale Networks and their Applications, Turin, Italy, 2012, pp. 1-6, doi: 10.1109/CNNA.2012.6331412. (Year: 2012).*
(Continued)

*Primary Examiner* — Vikkram Bali
(74) *Attorney, Agent, or Firm* — Faegre Drinker Biddle & Reath LLP

(57) ABSTRACT

An evaluation system is a system configured to evaluate coverage of an evaluation target by using a captured image of the evaluation target. The evaluation system includes: an image acquisition unit configured to acquire the captured image; a correction unit configured to generate an evaluation image by correcting the captured image; an evaluation unit configured to evaluate the coverage based on the evaluation image; and an output unit configured to output a result of the evaluation carried out by the evaluation unit, wherein the correction unit extracts an evaluation region from the captured image based on the size of a dent region included in the
(Continued)

captured image and generates the evaluation image based on the evaluation region, and the dent region is an image of a dent formed on the evaluation target.

14 Claims, 20 Drawing Sheets

(51) Int. Cl.
  *G06T 5/00* (2006.01)
  *G06T 7/90* (2017.01)
(52) U.S. Cl.
  CPC ...... *G06T 7/90* (2017.01); *G06T 2207/20081* (2013.01); *G06T 2207/20084* (2013.01)
(58) Field of Classification Search
  CPC . G06T 2207/30156; G06T 2207/30108; G06T 2207/30168; G06N 3/08; G06V 10/60
  USPC .......................... 382/141–147, 152, 110, 112
  See application file for complete search history.

(56) References Cited

U.S. PATENT DOCUMENTS

| | | | | |
|---|---|---|---|---|
| 6,031,933 | A | * | 2/2000 | Kumagai ........... A63B 37/0004 356/426 |
| 2011/0182499 | A1 | | 7/2011 | Feldmann et al. |
| 2014/0294282 | A1 | * | 10/2014 | Miyakura .............. G01N 3/068 382/141 |
| 2016/0217318 | A1 | | 7/2016 | Hayasaka |
| 2020/0058119 | A1 | * | 2/2020 | Safai ..................... G06T 7/0004 |

FOREIGN PATENT DOCUMENTS

| | | | | |
|---|---|---|---|---|
| CN | 106611719 | A | | 5/2017 |
| CN | 110889821 | A | | 3/2020 |
| EP | 3610986 | A1 | | 2/2020 |
| JP | 06174452 | A | * | 6/1994 |
| JP | 3455031 | B2 | * | 10/2003 |
| JP | 2006-297594 | A | | 11/2006 |
| JP | 2008-170198 | A | | 7/2008 |
| JP | 2010-017807 | A | | 1/2010 |
| JP | 2011-152603 | A | | 8/2011 |
| JP | 2012-189523 | A | | 10/2012 |
| JP | 2013-240815 | A | | 12/2013 |
| JP | 2015-160281 | A | | 9/2015 |
| JP | 2015-160282 | A | | 9/2015 |
| JP | 2018205002 | | * | 12/2018 ........... G06V 10/752 |
| TW | 201935320 | A | | 9/2019 |
| WO | WO-2019/159425 | A1 | | 8/2019 |

OTHER PUBLICATIONS

International Preliminary Report on Patentability dated Aug. 27, 2020 for PCT/JP2018/037250.

* cited by examiner

*Fig.11*

| NUMBER | CATEGORY | MATCH RATE |
|---|---|---|
| 1 | 0% | 0% |
| 2 | 10% | 0% |
| 3 | 20% | 0% |
| 4 | 30% | 0% |
| 5 | 40% | 50% |
| 6 | 50% | 50% |
| 7 | 60% | 0% |
| 8 | 70% | 0% |
| 9 | 80% | 0% |
| 10 | 90% | 0% |
| 11 | 100% | 0% |

Fig.12
(a)
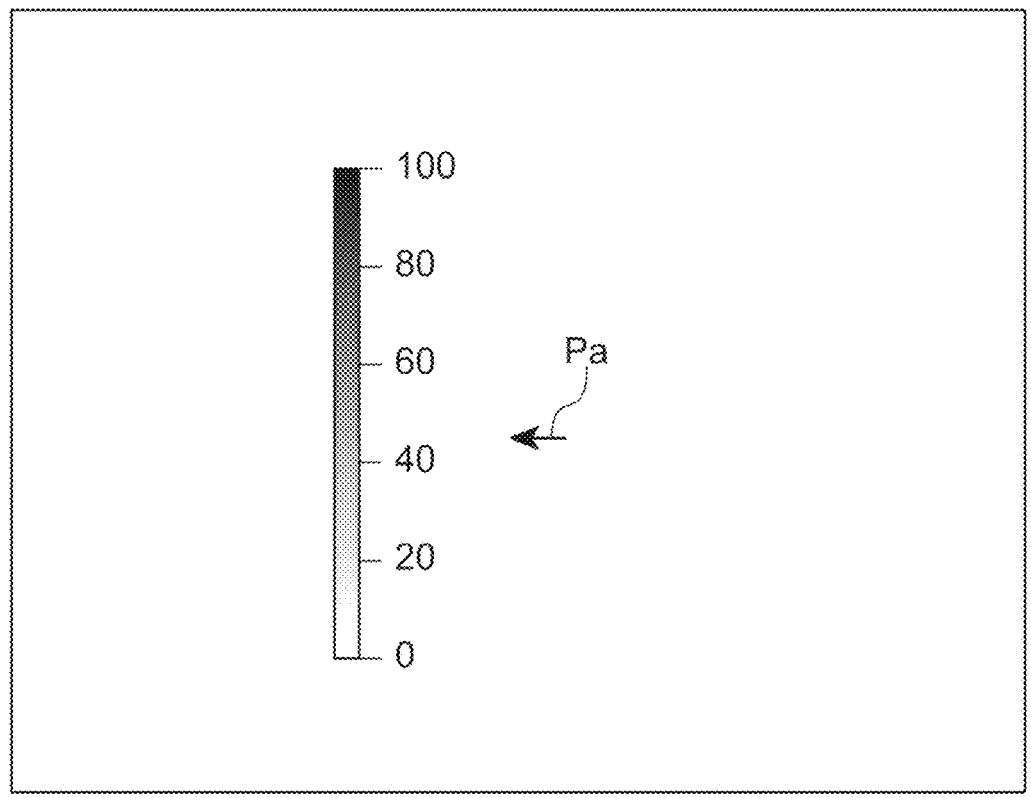
(b)
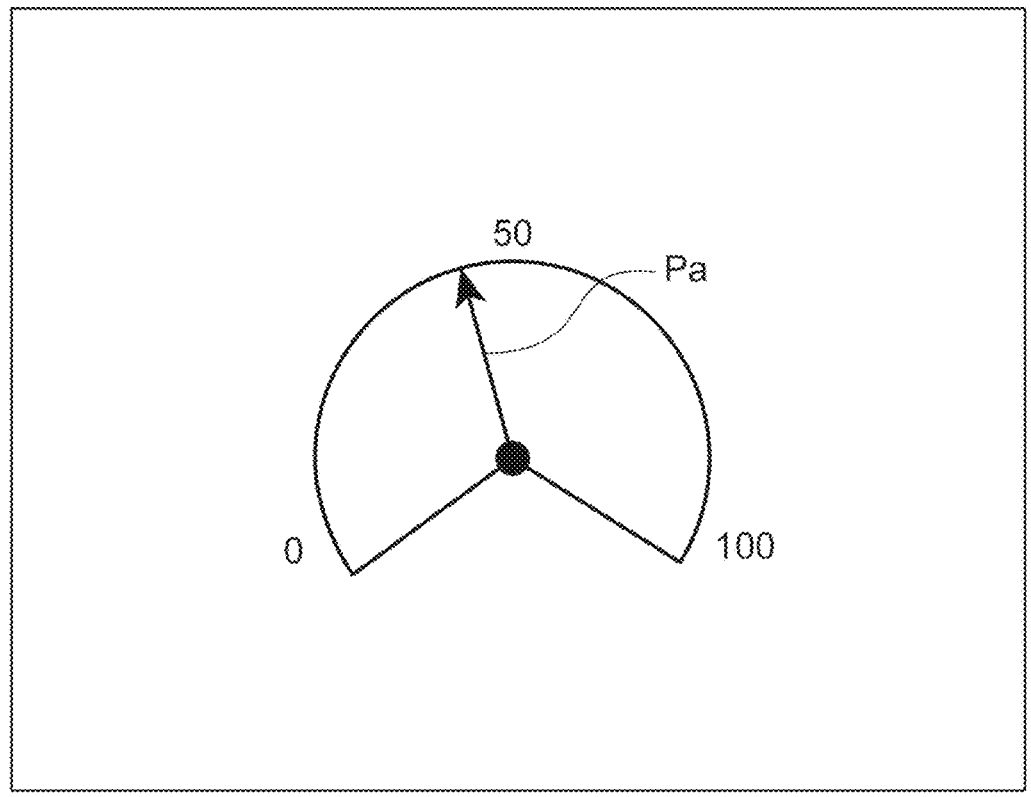

*Fig.13*
(a)
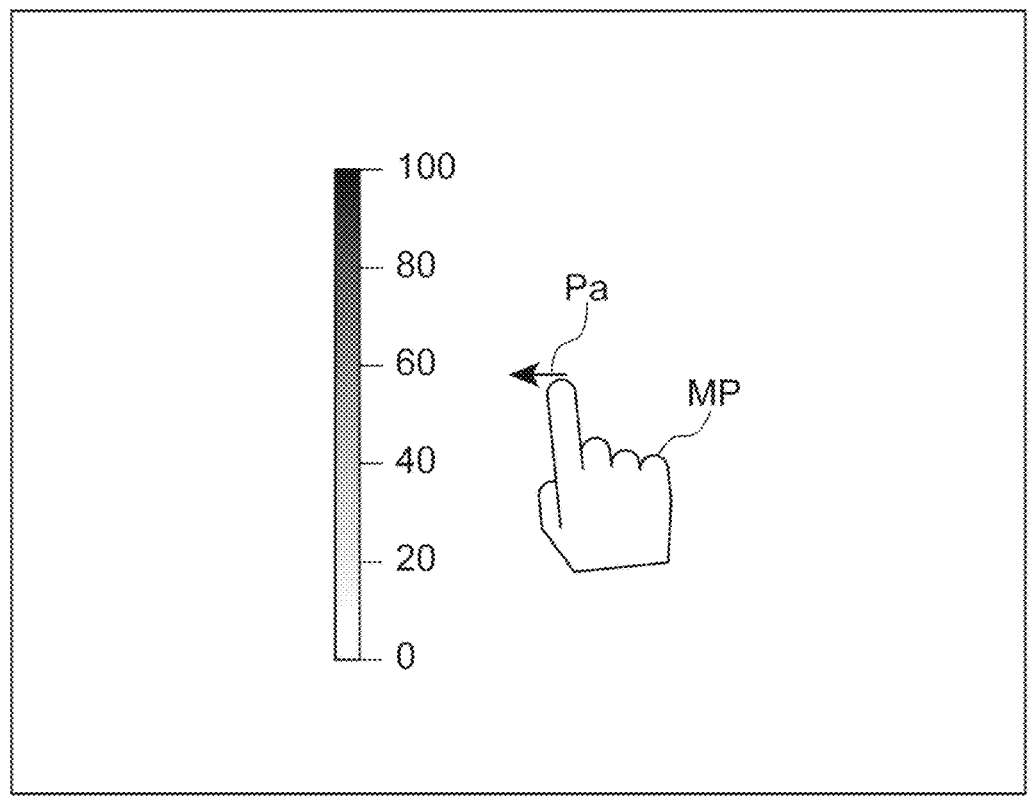
(b)
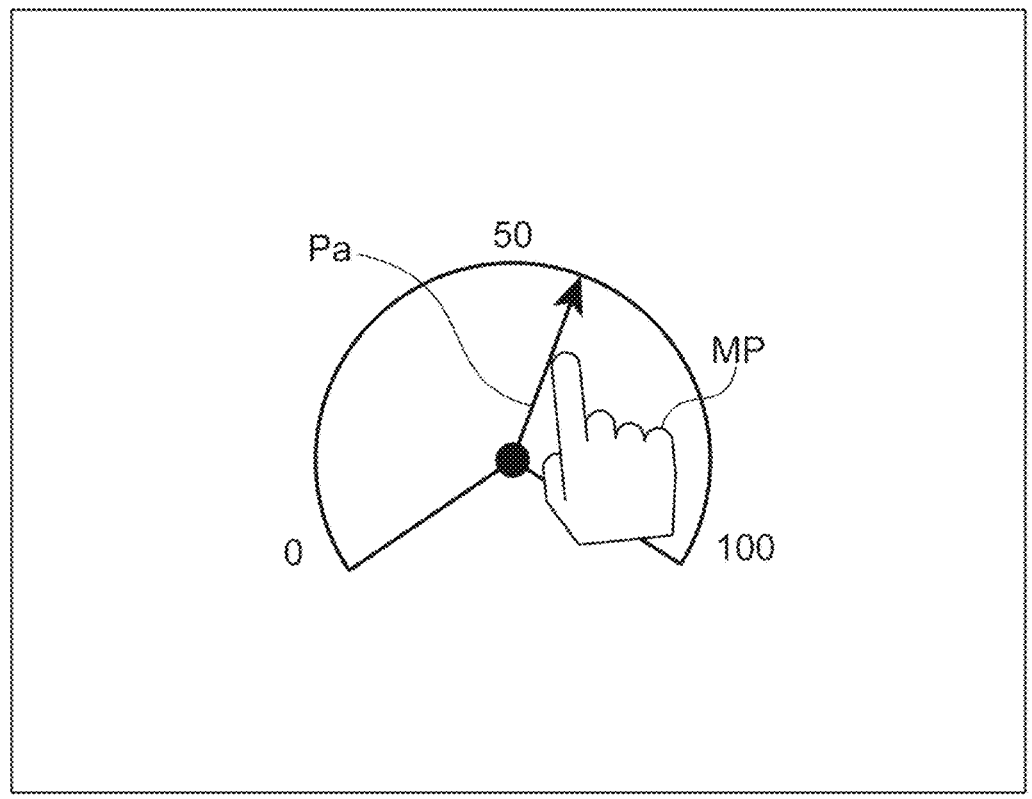

EVALUATION SYSTEM, EVALUATION DEVICE, EVALUATION METHOD, EVALUATION PROGRAM, AND RECORDING MEDIUM

TECHNICAL FIELD

The present disclosure relates to an evaluation system, an evaluation device, an evaluation method, an evaluation program, and a recording medium.

BACKGROUND ART

In order to improve the strength of machine parts, etc., the surfaces of machine parts, etc. are sometimes subjected to shot peening treatment. A coverage measuring device, which evaluates the finishing degree of such shot peening treatment, is known. For example, Patent Literature 1 discloses a coverage measuring device, which calculates coverage based on an image obtained by capturing an image of a treated surface and displays the coverage.

CITATION LIST

Patent Literature

Patent Literature 1: Japanese Unexamined Patent Publication No. 2011-152603

SUMMARY OF INVENTION

Technical Problem

Shot media having various sizes may be used for shot peening. Therefore, the sizes of dents formed on a treated surface change depending on the sizes of shot media. However, if the surfaces having the same area are used as evaluation targets with respect to the shot media having different sizes, the sizes of the shot media may affect the evaluation of coverage. For example, if the surface of an evaluation target does not have a sufficient area with respect to the size of shot media, the influence of a single dent on coverage increases, and evaluation of overall (average) coverage with respect to the target may fail.

In the present technical field, it is desired to improve the evaluation accuracy of coverage.

Solution to Problem

An evaluation system according to one aspect of the present disclosure is a system configured to evaluate coverage of an evaluation target by using a captured image of the evaluation target. This evaluation system includes: an image acquisition unit configured to acquire the captured image; a correction unit configured to generate an evaluation image by correcting the captured image; an evaluation unit configured to evaluate the coverage based on the evaluation image; and an output unit configured to output a result of the evaluation carried out by the evaluation unit. The correction unit extracts an evaluation region from the captured image based on the size of a dent region included in the captured image and generates the evaluation image based on the evaluation region. The dent region is an image of a dent formed on the evaluation target.

An evaluation device according to another aspect of the present disclosure is a device configured to evaluate coverage of an evaluation target by using a captured image of the evaluation target. This evaluation device includes: an image acquisition unit configured to acquire the captured image; a correction unit configured to generate an evaluation image by correcting the captured image; an evaluation unit configured to evaluate the coverage based on the evaluation image; and an output unit configured to output a result of the evaluation carried out by the evaluation unit. The correction unit extracts an evaluation region from the captured image based on the size of a dent region included in the captured image and generates the evaluation image based on the evaluation region. The dent region is an image of a dent formed on the evaluation target.

An evaluation method according to further another aspect of the present disclosure is a method to evaluate coverage of an evaluation target by using a captured image of the evaluation target. This evaluation method includes: a step of acquiring the captured image; a step of generating an evaluation image by correcting the captured image; a step of evaluating the coverage based on the evaluation image; and a step of outputting a result of the evaluation carried out in the step of evaluating the coverage. In the step of generating the evaluation image, an evaluation region is extracted from the captured image based on the size of a dent region included in the captured image, and the evaluation image is generated based on the evaluation region. The dent region is an image of a dent formed on the evaluation target.

An evaluation program according to further another aspect of the present disclosure is a program configured to cause a computer to execute: a step of acquiring a captured image of an evaluation target; a step of generating an evaluation image by correcting the captured image; a step of evaluating coverage of the evaluation target based on the evaluation image; and a step of outputting a result of the evaluation carried out in the step of evaluating the coverage. In the step of generating the evaluation image, an evaluation region is extracted from the captured image based on the size of a dent region included in the captured image, and the evaluation image is generated based on the evaluation region. The dent region is an image of a dent formed on the evaluation target.

A recording medium according to further another aspect of the present disclosure is a computer-readable recording medium recording an evaluation program configured to cause a computer to execute: a step of acquiring a captured image of an evaluation target; a step of generating an evaluation image by correcting the captured image; a step of evaluating coverage of the evaluation target based on the evaluation image; and a step of outputting a result of the evaluation carried out in the step of evaluating the coverage. In the step of generating the evaluation image, an evaluation region is extracted from the captured image based on the size of a dent region included in the captured image, and the evaluation image is generated based on the evaluation region. The dent region is an image of a dent formed on the evaluation target.

In the evaluation system, the evaluation device, the evaluation method, the evaluation program, and the recording medium, the evaluation region is extracted from the captured image of the evaluation target, and the evaluation image is generated based on the evaluation region. Then, coverage is evaluated based on the evaluation image, and the evaluation result is output. The evaluation region is extracted from the captured image based on the size of the dent region, which is the image of the dent formed on the evaluation target. Therefore, for example, if the dent region is large, the evaluation region can be extracted so that the area of the evaluation region becomes large. By virtue of this, the coverage is evaluated for the range which corresponds to the size of the dent region. As a result, the evaluation accuracy of the coverage can be improved.

The correction unit may extract the evaluation region from the captured image so that the larger the size of the dent region is, the evaluation region becomes larger. In such a case, errors in the coverage caused by the size of dents can be reduced. As a result, the evaluation accuracy of the coverage can be further improved.

The correction unit may set the size of the evaluation region by multiplying the size of the dent region by a constant determined in advance to extract the evaluation region from the captured image. In such a case, the influence of a single dent on the coverage can be reduced since the range (area) of the evaluation target can be sufficiently increased with respect to the size of the dent region. As a result, the evaluation accuracy of the coverage can be further improved.

The correction unit may expand or contract the evaluation region so as to adjust the size of the dent region to a predetermined size. In such a case, the evaluation by a neural network can be appropriately carried out.

The correction unit may correct the color of the evaluation region based on the color of the reference region included in the captured image. The reference region may be an image of a reference colored by a specific color. Even if the evaluation target is the same, the color tone of the captured image sometimes changes depending on the color tone of a light source used to capture the image. Also, even if the evaluation target is the same, the brightness of the captured image is sometimes different depending on the irradiation amount of light. According to the above described configuration, if the color of the reference region is different from the specific color, the color of the captured image is conceivably affected by light. Therefore, the influence of light can be reduced, for example, by correcting the color of the evaluation region so that the color of the reference region becomes the specific color (for example, the original color). By virtue of this, the evaluation accuracy of the coverage can be further improved.

The correction unit may remove specular reflection from the evaluation region. If the evaluation target is irradiated with intense light, specular reflection sometimes occur; and, if an image of the evaluation target is captured in that state, over exposure sometimes occur in the captured image. In the region in which the over exposure occurs, color information is lost. Therefore, the color information can be restored by removing the specular reflection (over exposure). By virtue of this, the evaluation accuracy of the coverage can be further improved.

The evaluation unit may evaluate coverage by using a neural network. In such a case, by causing the neural network to learn, the evaluation accuracy of the coverage can be further improved.

Advantageous Effects of Invention

According to the aspects and embodiments of the present disclosure, the evaluation accuracy of coverage can be improved.

BRIEF DESCRIPTION OF DRAWINGS

FIG. 11 is a diagram showing an example of an evaluation result.

FIGS. 12(*a*) and 12(*b*) are diagrams showing display examples of the evaluation result.

FIGS. 13(*a*) and 13(*b*) are diagrams showing correction example of the evaluation result.

DESCRIPTION OF EMBODIMENTS

Hereinafter, embodiments of the present disclosure will be described in detail with reference to the drawings. Note that the same elements in the description of the drawings are denoted by the same reference signs, and redundant descriptions will be omitted.

First Embodiment

Figure 1:
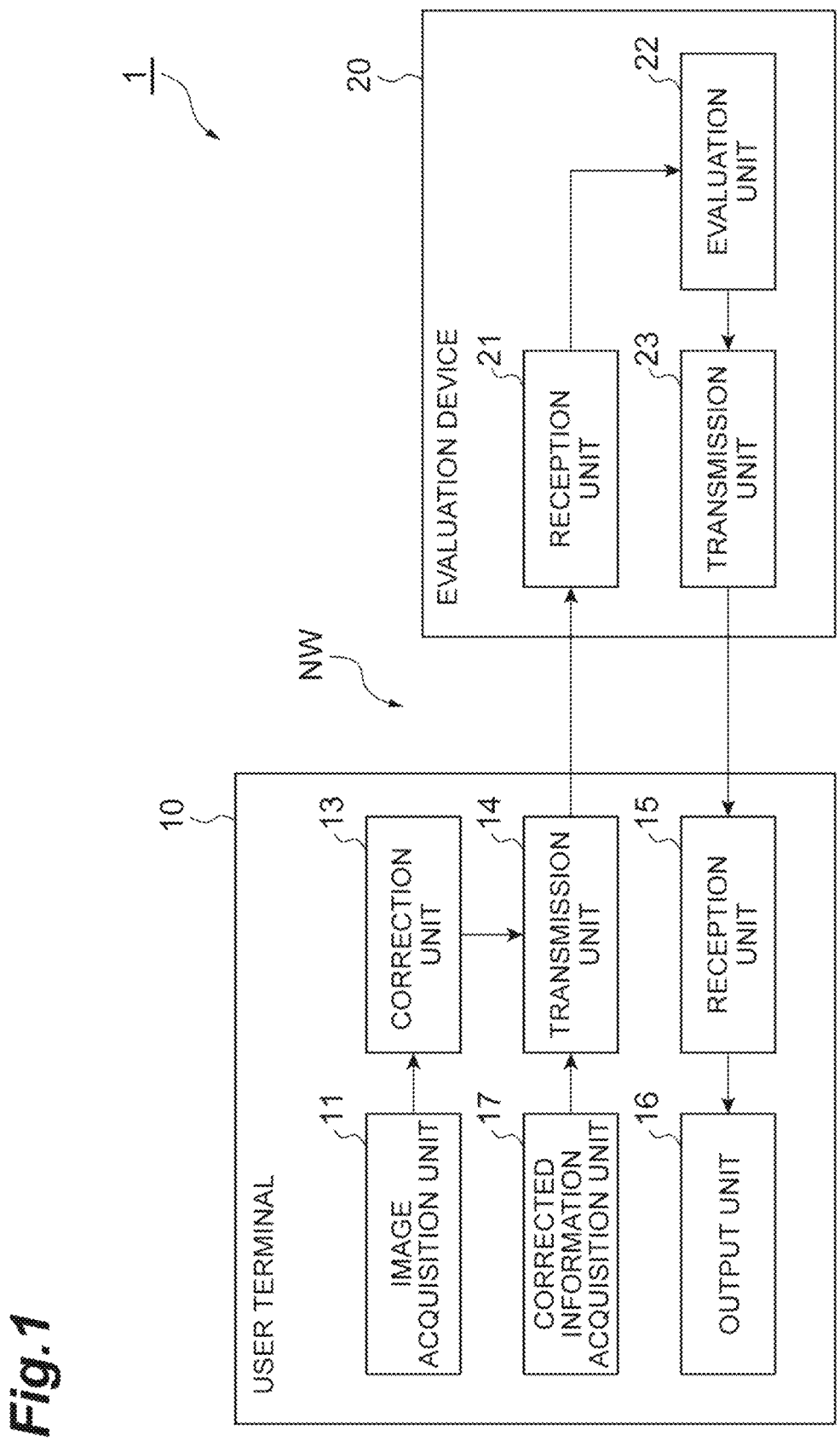
FIG. 1 is a configuration diagram schematically showing an evaluation system including an evaluation device according to a first embodiment.

FIG. 1 is a configuration diagram schematically showing an evaluation system including an evaluation device according to a first embodiment. The evaluation system 1 shown in FIG. 1 is a system which evaluates the coverage of an evaluation target. Examples of the evaluation target include Almen strips, gears, and springs. The coverage is the rate of the area in which dents are formed by shots with respect to the total surface area, which is the target of measurement.

The evaluation system 1 includes a single or a plurality of user terminal(s) 10 and an evaluation device 20. The user terminal 10 and the evaluation device 20 are connected by a network NW so that they can communicate with each other. The network NW may either be wired or wireless. Examples of the network NW include the Internet, a mobile communication network, and a wide area network (WAN).

The user terminal 10 is a terminal device used by a user. The user terminal 10 generates a captured image of an evaluation target by capturing an image of the evaluation target and transmits the captured image to the evaluation device 20. The user terminal 10 receives an evaluation result from the evaluation device 20 and outputs the evaluation result to the user. The user terminal 10 may be applied to a mobile terminal in which an image capture device is built or may be applied to a device which can communicate with an image capture device. The mobile terminal in which the image capture device is built is used as the user terminal 10 to describe the present embodiment. Examples of the mobile terminal include a smartphone, a tablet terminal, and a laptop personal computer (PC).

Figure 2:
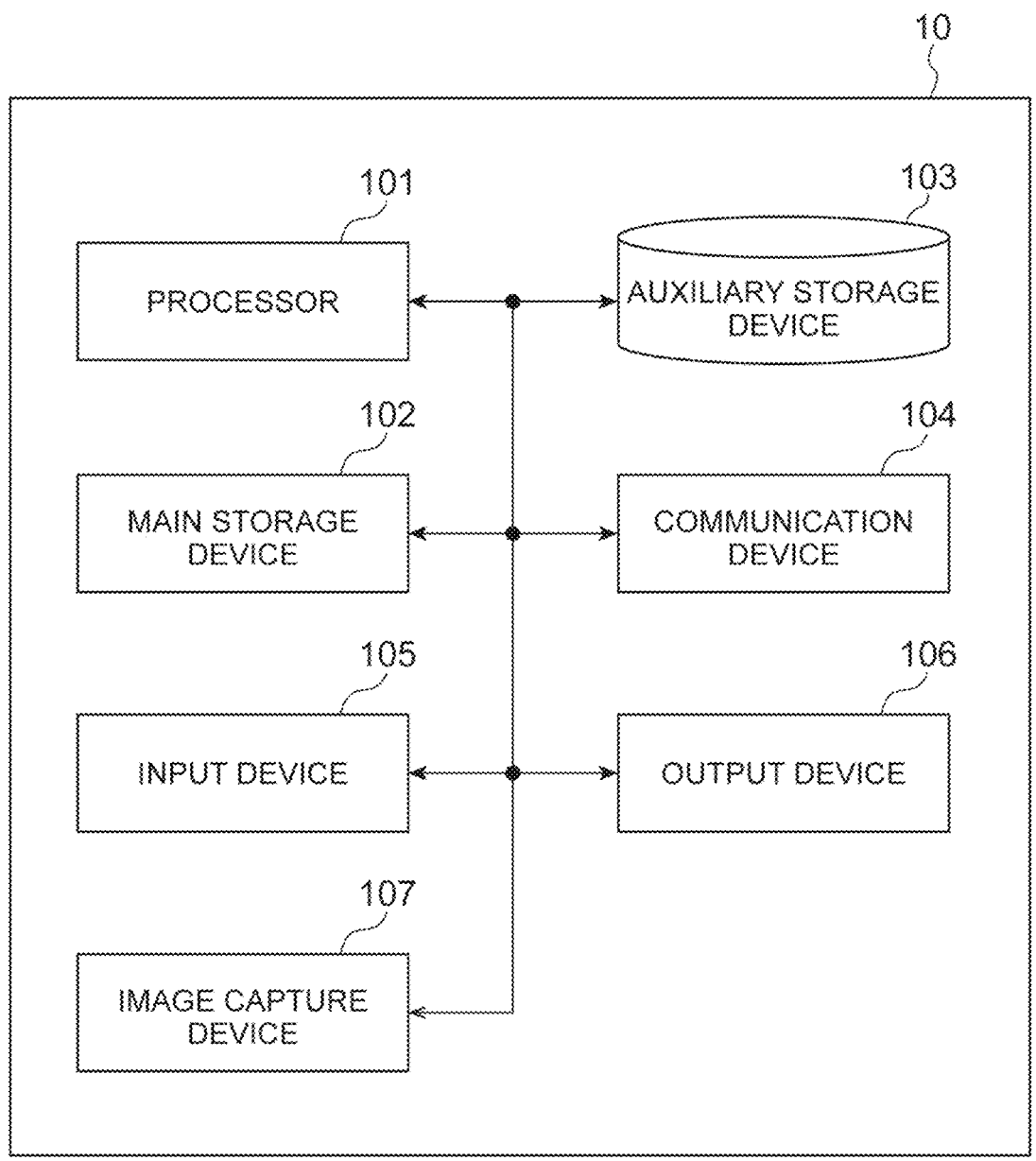
FIG. 2 is a hardware configuration diagram of a user terminal shown in FIG. 1.

FIG. 2 is a hardware configuration diagram of the user terminal shown in FIG. 1. As shown in FIG. 2, the user terminal 10 can be physically formed as a computer including hardware such as a single or a plurality of processor(s) 101, a main storage device 102, an auxiliary storage device 103, a communication device 104, an input device 105, an output device 106, and an image capture device 107. A processor having a high processing speed is used as the processor 101. Examples of the processor 101 include a graphics processing unit (GPU) and a central processing unit (CPU). The main storage device 102 includes, for example, a random access memory (RAM) and a read only memory (ROM). Examples of the auxiliary storage device 103 include a semiconductor memory and a hard disk device.

The communication device 104 is a device which transmits/receives data to/from other devices via the network NW. Examples of the communication device 104 include a network card. Encryption may be used for the transmission and reception of data via the network NW. In other words, the communication device 104 may encrypt data and transmit the encrypted data to other devices. The communication device 104 may receive encrypted data from other devices and decrypt the encrypted data. Common key cryptography such as triple data encryption standard (DES) and Rijndael or public key cryptography such as RSA and ElGamal can be used in the encryption.

The input device 105 is a device which is used when the user is to operate the user terminal 10. Examples of the input device 105 include a touch screen, a keyboard, and a mouse. The output device 106 is a device which outputs various information to the user of the user terminal 10. Examples of the output device 106 include a display, a speaker, and a vibrator.

The image capture device 107 is a device for capturing images (imaging). The image capture device 107 is, for example, a camera module. Specifically, the image capture device 107 includes: a plurality of optical-system parts such as lenses and image capture elements, a plurality of control-system circuits which drive and control them, and a signal-processing-system circuit unit which converts the electric signals, which represent captured images generated by the image capture elements, to image signals, which are digital signals.

The functions of the user terminal 10 shown in FIG. 1 are realized by causing the hardware of the main storage device 102, etc. to read a single or a plurality of predetermined computer program(s) so as to operate the hardware under control of the single or plurality of processor(s) 101 and by reading and writing data in the main storage device 102 and the auxiliary storage device 103.

The user terminal 10 includes, in terms of function, an image acquisition unit 11, a correction unit 13, a transmission unit 14, a reception unit 15, an output unit 16, and a corrected information acquisition unit 17.

The image acquisition unit 11 is a part for acquiring a captured image including an evaluation target. The image acquisition unit 11 is realized, for example, by the image capture device 107. The captured image may be a still image or a moving image. The captured image is, for example, acquired as image data, which shows pixel values of pixels (pixels). However, for explanatory convenience, the captured image is described as a captured image. If the user terminal 10 does not have the image capture device 107, the image acquisition unit 11 acquires the captured image, for example, by receiving the captured image, which has been captured by another device (for example, a terminal having a camera function), from the other device. For example, in a case in which the image acquisition unit 11 receives the captured image from the other device via the network NW, the part that processes reception of the captured image (for example, the communication device 104 of FIG. 2) functions as the image acquisition unit 11. The image acquisition unit 11 outputs the captured image to the correction unit 13.

The correction unit 13 is a part for generating an evaluation image by correcting the captured image. The correction unit 13 extracts an evaluation region from the captured image and generates the evaluation image based on the evaluation region. The evaluation region is determined depending on the size of a dent region, which is an image of a dent included in the captured image. The correction unit 13 performs, for example, size correction, distortion correction, color correction, specular reflection removal, noise removal, and blur correction on the captured image. Details of each correction processing will be described later. The correction unit 13 outputs the evaluation image to the transmission unit 14.

The transmission unit 14 is a part for transmitting the evaluation image to the evaluation device 20. The transmission unit 14 transmits the evaluation image to the evaluation device 20 via the network NW. The transmission unit 14 further transmits corrected information, which is acquired by the corrected information acquisition unit 17, to the evaluation device 20. The transmission unit 14 is realized, for example, by the communication device 104. The reception unit 15 is a part for receiving an evaluation result from the evaluation device 20. The reception unit 15 receives the evaluation result from the evaluation device 20 via the network NW. The reception unit 15 is realized, for example, by the communication device 104.

The output unit 16 is a part for outputting the evaluation result. The output unit 16 is realized, for example, by the output device 106. In a case in which the evaluation result is output by an output device such as a display of another device, the output unit 16, for example, transmits the evaluation result to the other device via the network NW. In that case, the part which processes the transmission of the evaluation result (for example, the communication device 104 of FIG. 2) functions as the output unit 16.

The corrected information acquisition unit 17 is a part for acquiring the corrected information of the evaluation result. For example, the user sometimes checks the evaluation result, which is output by the output unit 16, and then corrects the evaluation result by using the input device 105. In that case, the corrected information acquisition unit 17 acquires the corrected evaluation result as corrected information. The corrected information acquisition unit 17 outputs the corrected information to the transmission unit 14.

The evaluation device 20 is a device which evaluates the coverage of the evaluation target by using the captured image (evaluation image) of the evaluation target. The evaluation device 20 includes, for example, an information processing device (server device) such as a computer.

Figure 3:
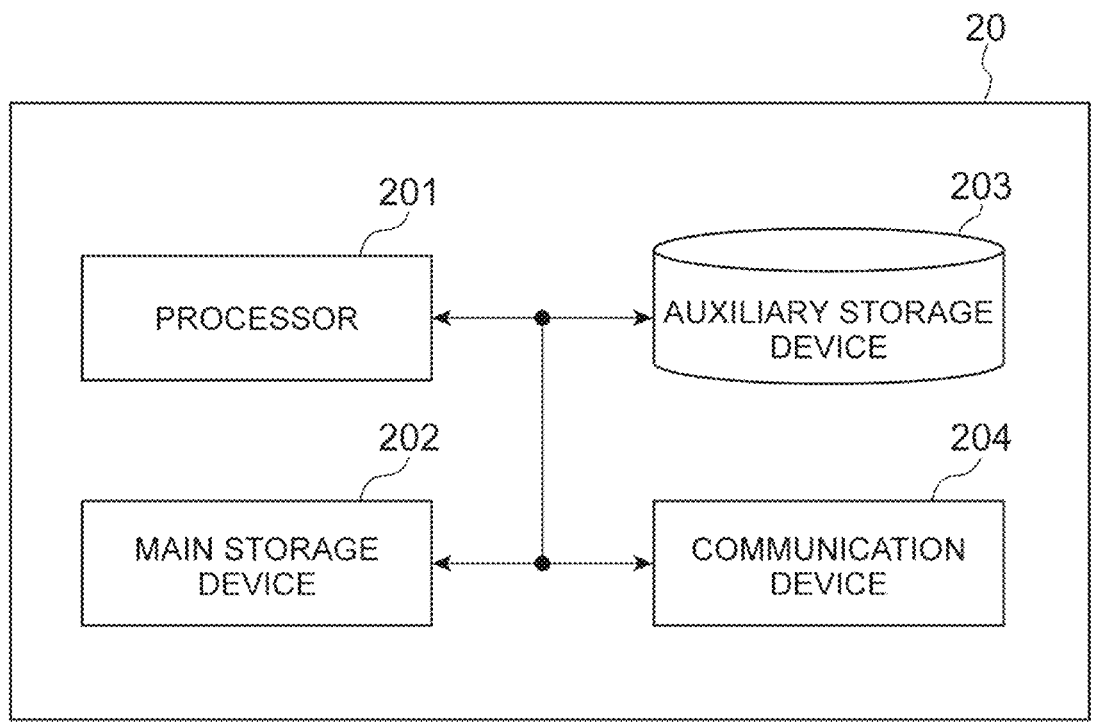
FIG. 3 is a hardware configuration diagram of the evaluation device shown in FIG. 1.

FIG. 3 is a hardware configuration diagram of the evaluation device shown in FIG. 1. As shown in FIG. 3, the evaluation device 20 can be physically formed as a computer including hardware such as a single or a plurality of processor(s) 201, a main storage device 202, an auxiliary storage device 203, and a communication device 204. A processor having a high processing speed is used as the processor 201. Examples of the processor 201 include a GPU and a CPU. The main storage device 202 is formed by, for example, a RAM and a ROM. Examples of the auxiliary storage device 203 include a semiconductor memory and a hard disk device.

The communication device 204 is a device which transmits/receives data to/from other devices via the network NW. Examples of the communication device 204 include a network card. Encryption may be used for the transmission and reception of data via the network NW. In other words, the communication device 204 may encrypt data and transmit the encrypted data to other devices. The communication device 204 may receive encrypted data from other devices and decrypt the encrypted data. Common key cryptography such as triple DES and Rijndael or public key cryptography such as RSA and ElGamal can be used in the encryption.

The communication device 204 may carry out user authentication to determine whether the user of the user terminal 10 is a valid user or an invalid user. In that case, the evaluation device 20 may be configured to carry out coverage evaluation if the user is a valid user and not to carry out coverage evaluation if the user is an invalid user. For example, a user identifier (ID) and a password registered in advance are used in the user authentication. A one-time pad (one-time password) may be used in the user authentication.

The functions of the evaluation device 20 shown in FIG. 1 are realized by causing the hardware of the main storage device 202, etc. to read a single or a plurality of predetermined computer program(s) so as to operate the hardware under control of the single or plurality of processor(s) 201 and reading and writing data by the main storage device 202 and the auxiliary storage device 203.

The evaluation device 20 includes, in terms of function, a reception unit 21, an evaluation unit 22, and a transmission unit 23.

The reception unit 21 is a part for receiving the evaluation image from the user terminal 10. The reception unit 21 receives the evaluation image from the user terminal 10 via the network NW. The reception unit 21 further receives the corrected information from the user terminal 10. The reception unit 21 is realized, for example, by the communication device 204. The reception unit 21 outputs the evaluation image and the corrected information to the evaluation unit 22.

The evaluation unit 22 is a part for evaluating the coverage of the evaluation target based on the evaluation image. The evaluation unit 22 evaluates the coverage of the evaluation target by using a neural network. The neural network may be a convolutional neural network (Convolutional Neural Network: CNN) or may be a recurrent neural network (Recurrent Neural Network: RNN). The evaluation unit 22 outputs the evaluation result to the transmission unit 23.

The transmission unit 23 is a part for transmitting the evaluation result to the user terminal 10. The transmission unit 23 transmits the evaluation result to the user terminal 10 via the network NW. The transmission unit 23 is realized, for example, by the communication device 204. Note that, since the transmission unit 23 outputs (transmits) the evaluation result to the user terminal 10, the transmission unit 23 may be considered as an output unit.

Figure 4:
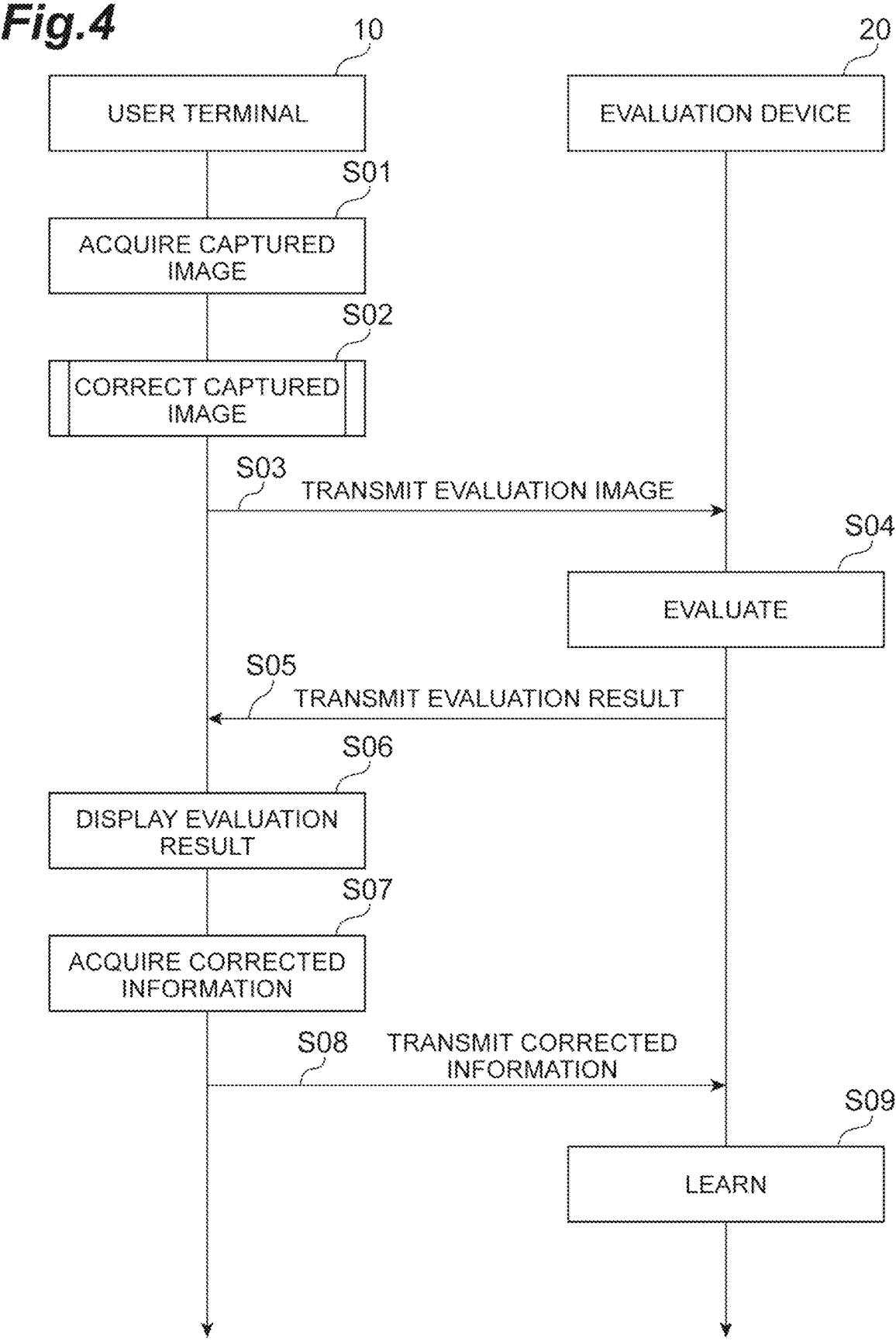
FIG. 4 is a sequence diagram showing an evaluation method carried out by the evaluation system shown in FIG. 1.
Figure 5:
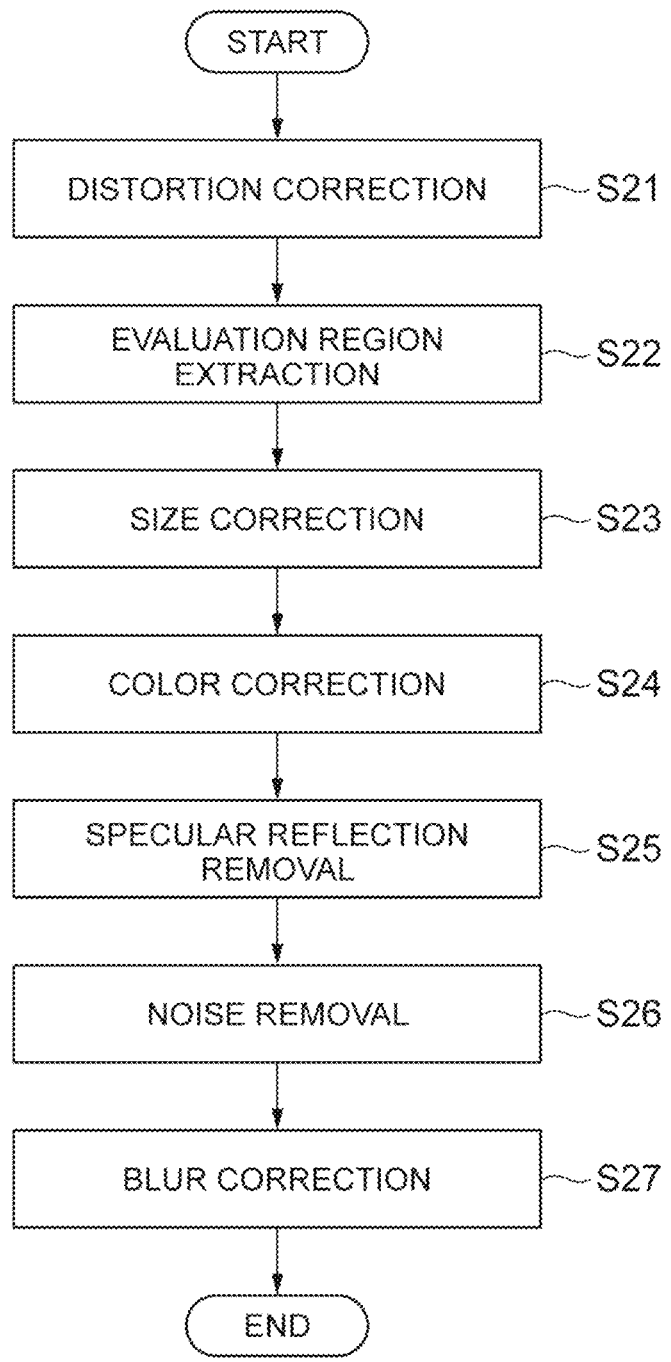
FIG. 5 is a flowchart showing details of correction processing shown in FIG. 4.
Figure 6:
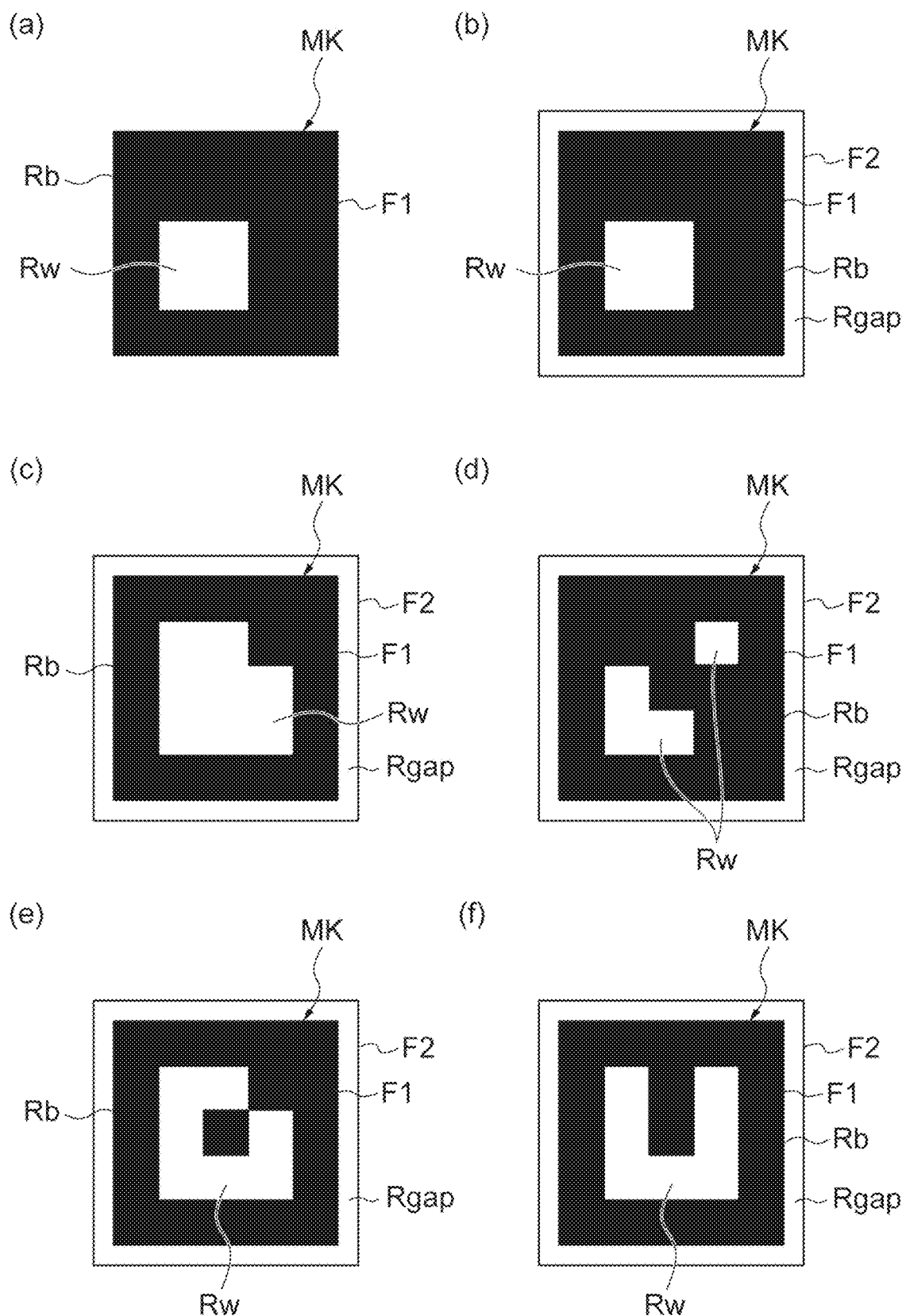
FIGS. 6(*a*) to 6(*f*) are diagrams showing examples of a marker.
Figure 7:
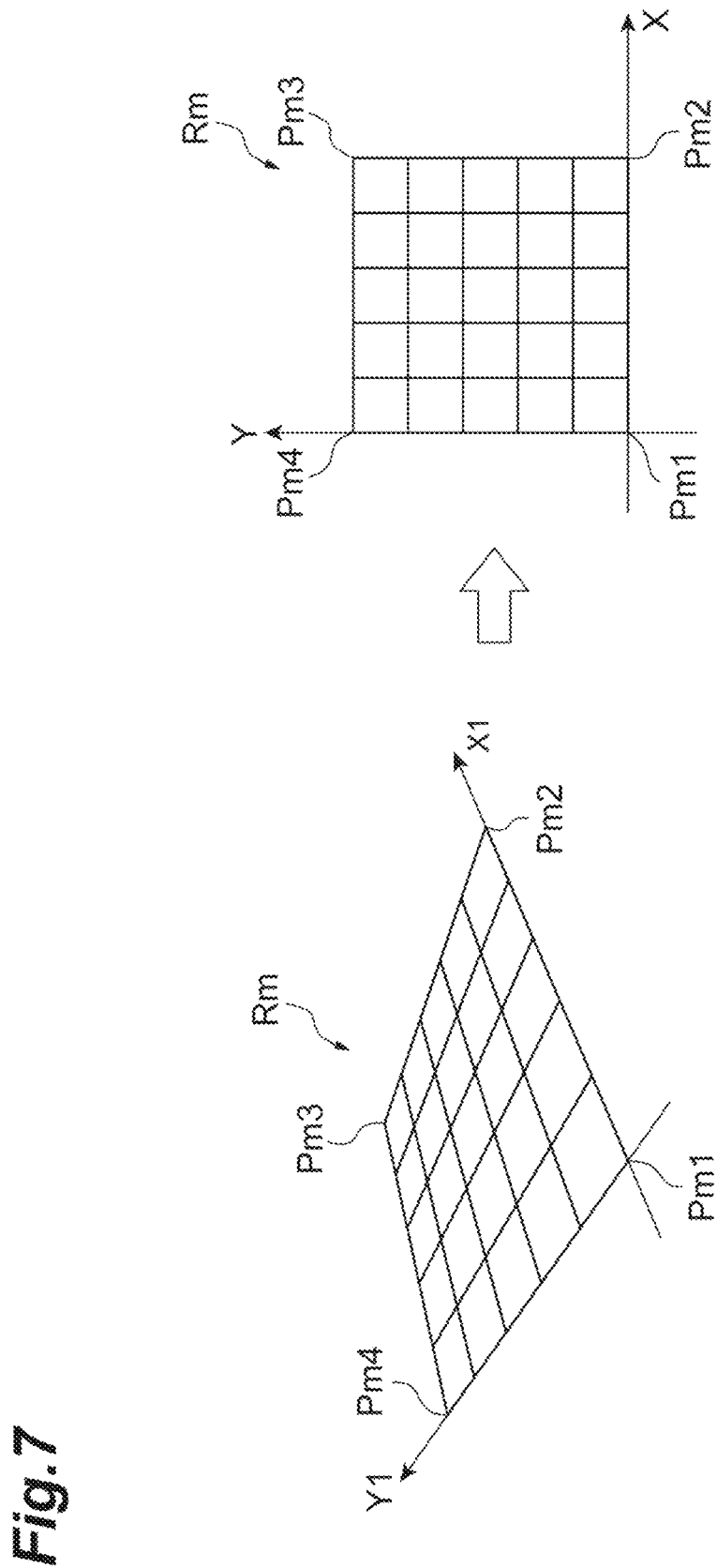
FIG. 7 is a diagram for describing distortion correction.
Figure 8:
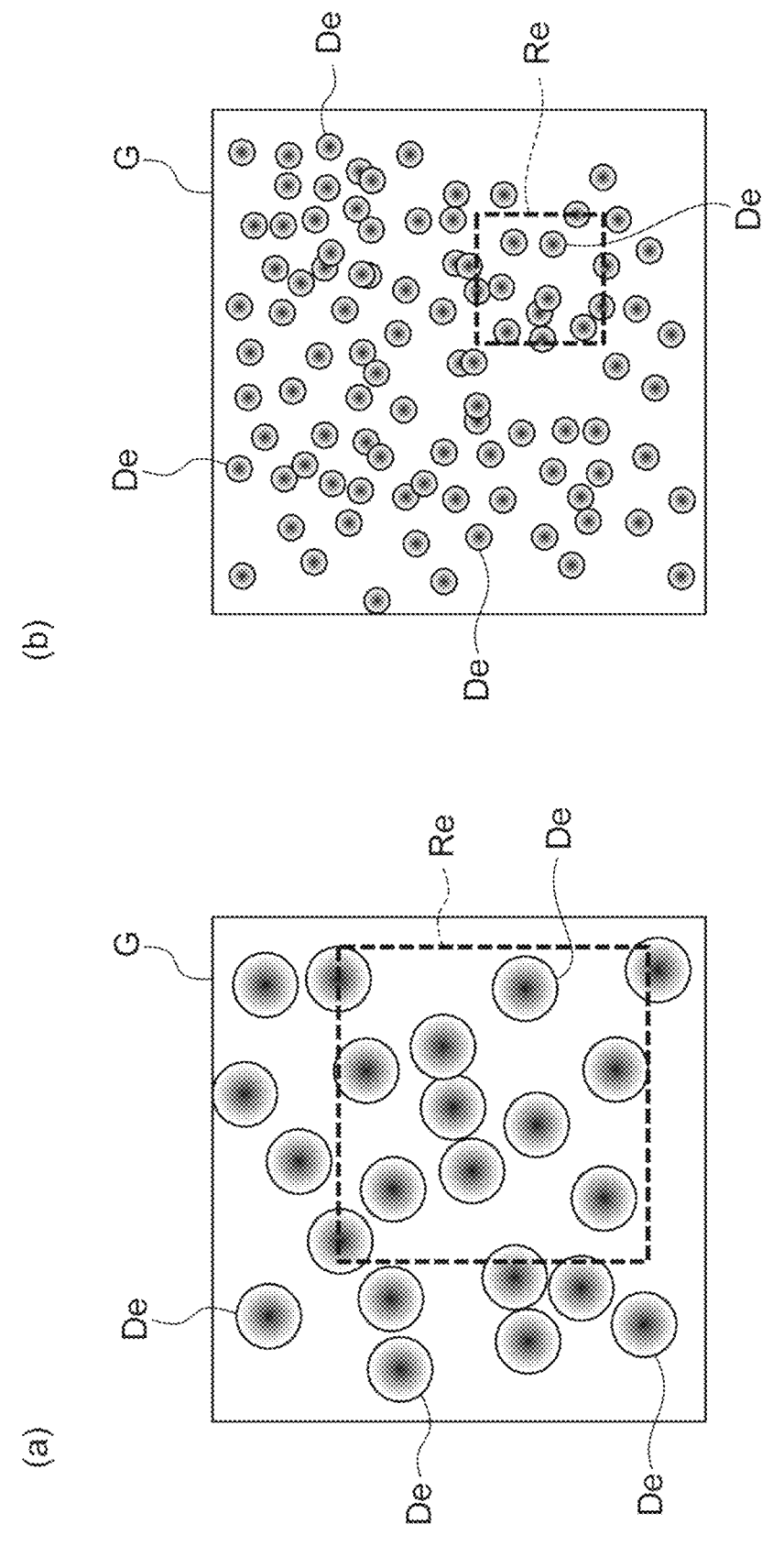
FIGS. 8(*a*) and 8(*b*) are diagrams for describing extraction of an evaluation region.
Figure 9:
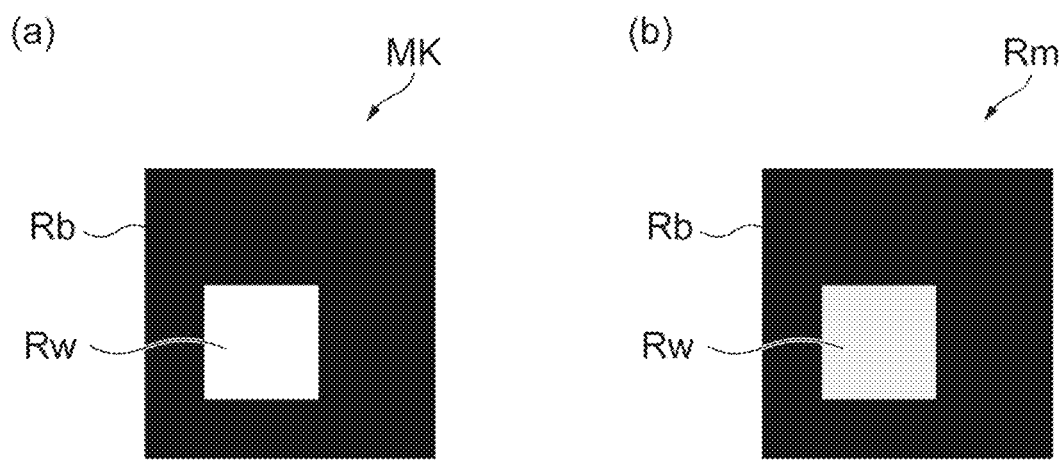
FIGS. 9(*a*) and 9(*b*) are diagrams for describing color correction.
Figure 10:
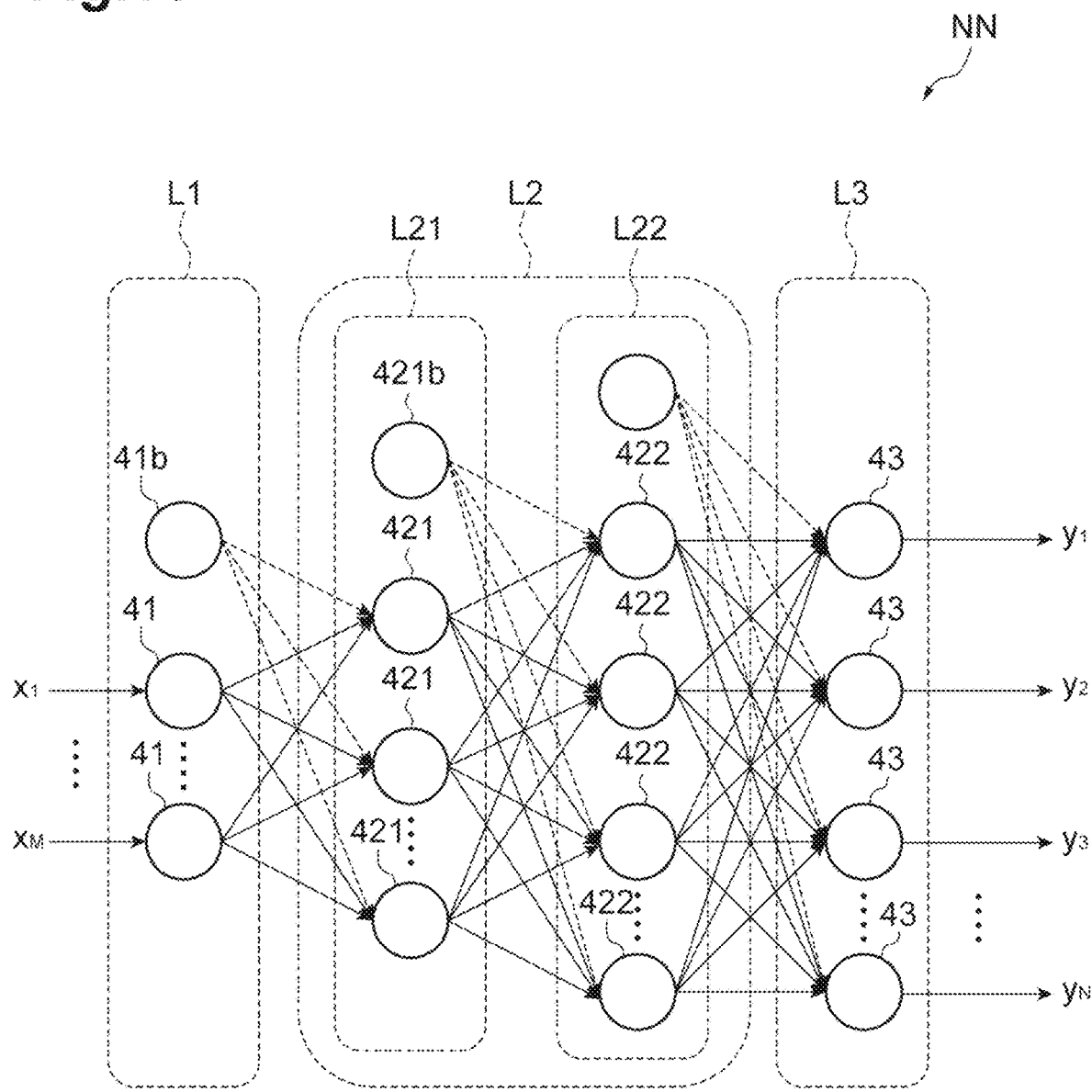
FIG. 10 is a diagram showing an example of the neural network.

Next, an evaluation method carried out by the evaluation system 1 will be described with reference to FIG. 4 to FIG. 13(b). FIG. 4 is a sequence diagram showing the evaluation method carried out by the evaluation system shown in FIG. 1. FIG. 5 is a flowchart showing details of the correction processing shown in FIG. 4. FIGS. 6(a) to 6(f) are diagrams showing examples of a marker. FIG. 7 is a diagram for describing distortion correction. FIGS. 8(a) and 8(b) are diagrams for describing extraction of the evaluation region. FIGS. 9(a) and 9(b) are diagrams for describing color correction. FIG. 10 is a diagram for showing an example of the neural network. FIG. 11 is a diagram showing an example of the evaluation result. FIGS. 12(a) and 12(b) are diagrams showing display examples of the evaluation result. FIGS. 13(a) and 13(b) are diagrams showing correction example of the evaluation result.

The series of processes of the evaluation method shown in FIG. 4 is started, for example, when the user of the user terminal 10 captures an image of an evaluation target by using the image capture device 107. First, the image acquisition unit 11 acquires a captured image of the evaluation target (step S01). For example, the image acquisition unit 11 acquires, as the captured image, an image of the evaluation target generated by the image capture device 107. Then, the image acquisition unit 11 outputs the acquired captured image to the correction unit 13.

Note that, before the captured image of the evaluation target is acquired, a marker MK may be attached to the evaluation target. The marker MK is used for correcting the captured image in later-described image processing. The marker MK has a shape with which the direction of the marker MK can be specified. The marker MK is asymmetric at least in either one of a top-bottom direction and a width direction. Specifically, as shown in FIGS. 6(a) to 6(f), the marker MK includes a white colored region Rw and a black colored region Rb. In order to facilitate the later-described image processing, the marker MK has a tetragonal edge F1. The edge F1 is an edge of the region Rb. As shown in FIGS. 6(b) to 6(f), the marker MK may be surrounded by a frame F2, and a gap Rgap may be provided between the frame F2 and the region Rb.

The marker MK is drawn on a sheet-like member. For example, the user of the user terminal 10 directly pastes the sheet-like member, which includes the marker MK, onto the evaluation target. The user may paste the sheet-like member, which includes the marker MK, onto the evaluation target by using an unmanned aerial vehicle (UAV) or an extensible rod.

Note that the marker MK is only required to include two or more differently colored regions. For example, the color of the region Rw is not required to be white, but may be, for example, gray. The color of the region Rb is not required to be black, but may be a color having saturation. In the present embodiment, the marker MK shown in FIG. 6(a) is used.

Subsequently, the correction unit 13 corrects the captured image (step S02). As shown in FIG. 5, in the correction processing of step S02, first, the correction unit 13 carries out distortion correction in order to correct the distortion of the captured image (step S21). The captured image is sometimes distorted compared with an image which is obtained by capturing an image of the evaluation target from a front side. For example, if the image capture device 107 is a depth camera, the distances between the image capture device 107 and positions of the evaluation target are obtained. In that case, the correction unit 13 carries out distortion correction by converting the captured image to the image, which is obtained by capturing an image of the evaluation target from the front side, based on the distances between the image capture device 107 and the positions of the evaluation target. If the evaluation target is a structure having an aspect such as a spring, the correction unit 13 may further carry out aspect correction as distortion correction.

The correction unit 13 may carry out the distortion correction by using the marker MK. The captured image of the evaluation target with the marker MK includes a marker region Rm, which is an image (image region) of the marker MK. In that case, first, the correction unit 13 extracts the marker region Rm from the captured image. The correction unit 13 extracts the marker region Rm, for example, by performing object detection processing or edge detection processing on the captured image. If the marker MK has a simple shape, edge detection processing sometimes has higher detection accuracy and higher processing speed than object detection processing, and, therefore, edge detection processing may be used.

Then, the correction unit 13 checks whether the extracted marker region Rm is the image of the marker MK or not. The correction unit 13, for example, carries out histogram averaging processing with respect to the marker region Rm and then carries out binarization processing with respect to the marker region Rm. Then, the correction unit 13 compares the binarized marker region Rm with the marker MK and, if they match, determines that the marker region Rm is the image of the marker MK. As a result, the vertex coordinates of the marker MK in the captured image are acquired. If they do not match, the correction unit 13 determines that the marker region Rm is not the image of the marker MK and extracts the marker region Rm again.

Then, the correction unit 13 calculates the direction of the marker MK in the captured image by using the marker region Rm. Since the marker MK is asymmetric at least in either one of the top-bottom direction and the width direction, the direction of the marker MK in the captured image can be calculated. Then, as shown in FIG. 7, the correction unit 13 subjects the captured image to projection transformation so that the original shape of the marker MK is restored from the vertex coordinates and direction of the marker MK in the captured image, thereby converting the captured image to the image, which is obtained by capturing an image of the evaluation target from the front side. Specifically, the correction unit 13 uses a vertex Pm1 as an origin, the direction from the vertex Pm1 toward a vertex Pm2 as an X1 axis direction, and the direction from the vertex Pm1 toward a vertex Pm4 as a Y1 axis direction. Then, the correction unit 13 converts an X1-Y1 coordinate system to an X-Y orthogonal coordinate system, thereby restoring the shape of the marker MK. As a result, the distortion correction is carried out.

Subsequently, the correction unit 13 extracts an evaluation region Re from the captured image (step S22). Since a single shot peening is carried out with the shot media having the same size, the sizes of dents are similar to one another. However, the types of shot media used in shot peening include, for example, shot media having diameters (grain diameters) of about 0.1 mm to 1 mm. Therefore, the size of the shot media used in a shot peening is sometimes different from the size of the shot media used in another shot peening. If coverage is evaluated for these shot media by using the same area, the influence on the coverage evaluation caused by a single dent is different depending on the size (diameter) of the shot media. Therefore, as shown in FIGS. 8(*a*) and 8(*b*), the correction unit 13 extracts the evaluation region Re from the captured image G based on the size of a dent region De included in the captured image G and generates an evaluation image based on the evaluation region Re. The dent region De is an image of a dent formed on the evaluation target.

As the size of the dent region De, for example, the average size (for example, average diameter) of a plurality of dent regions De included in the captured image G is used. The correction unit 13 detects the plurality of dent regions De included in the captured image U, for example, by object detection. Then, the correction unit 13 calculates the average size (for example, average diameter) of the plurality of dent regions De included in the captured image G and extracts the evaluation region Re from the captured image G so that the larger the average size of the dent region De is, the evaluation region Re becomes larger. Specifically, the correction unit 13 sets the size of the evaluation region Re by multiplying the average size (average diameter) of the dent region De by a multiplying factor (for example, by 5 to 10) determined in advance. For example, the correction unit 13 extracts a square region having a length of a side which is equal to the multiplication result as the evaluation region Re from the captured image.

Subsequently, the correction unit 13 corrects the size of the evaluation region Re (step S23). The size of the evaluation region Re can be changed depending on the size of the dent region De. Therefore, in the size correction, the correction unit 13 carries out expansion/contraction processing of the evaluation region Re so that the size of the dent region De is adjusted to a predetermined size (reference grain diameter). As a result, the size of the evaluation region Re is adjusted to a predetermined evaluation size. The evaluation size is the size of a reference image (teaching data) used in learning of a neural network NN.

In the expansion/contraction processing, first, the correction unit 13 compares the size (average diameter) of the dent region De with the reference grain diameter and determines which one of expansion processing and contraction processing is to be carried out. If the average diameter of the dent regions De is smaller than the reference grain diameter, the correction unit 13 carries out expansion processing. If the average diameter of the dent regions De is larger than the reference grain diameter, the correction unit 13 carries out contraction processing. In other words, the correction unit 13 adjusts the size of the evaluation image to the evaluation size by expanding or contracting the evaluation region Re. In the expansion processing, for example, bilinear interpolation is used. In the contraction processing, for example, the average pixel method is used. Other expansion/contraction algorithms may be used in the expansion processing and the contraction processing, and it is desired to maintain the state of the image even after the expansion/contraction processing.

Subsequently, the correction unit 13 carries out color correction of the evaluation region Re (step S24). Even for the same evaluation target, the brightness of the image may change depending on an image capturing environment. Moreover, if the color of a light source used to capture an image is different, the color of the image may also be different. In order to reduce the influence of the image capturing environment, color correction is carried out. The correction unit 13 corrects the colors of the evaluation region Re based on the color of a reference region included in the captured image. The reference region is an image (image region) of a reference colored by a specific color.

As shown in FIG. 9(a), the region Rw of the marker MK can be used as the reference. In such a case, the color of the region Rw of the marker MK is measured in advance by a color meter or the like, and reference value indicating the measured color are stored in a memory, which is not shown in the drawings. As the value indicating the color, for example, RGB value and HSV value are used. As shown in FIG. 9(b), the correction unit 13 acquires the values of the color of the region Rw of the marker region Rm included in the captured image (evaluation region Re), compares the acquired values with reference value, and carries out color correction so that the differences therebetween are reduced (for example, to zero). As the color correction, for example, gamma correction is used. Differences may be added to respective pixel values (offset processing) as color correction.

The marker MK is not required to be used as the reference. In such a case, like the case in which the marker MK is used, color correction of the evaluation region Re may be carried out by using a sample (for example, a gray board), which has a color measured in advance, as a reference and capturing an image thereof with the evaluation target. The correction unit 13 may carry out color correction based on the gray world assumption.

Subsequently, the correction unit 13 removes specular reflection from the evaluation region Re (step S25). Specular reflection is sometimes caused when the evaluation target has metallic luster. Specular reflection is sometimes caused depending on the state of coating of the evaluation target. In an image, the part at which specular reflection has occurred usually appears to be intense white. In other words, the part at which specular reflection has occurred causes over exposure in an image. After the color correction, the part at which specular reflection has occurred can be detected as a white part. Therefore, the correction unit 13 removes the specular reflection by using the image (evaluation region Re) after the color correction.

Therefore, the correction unit 13 specifies a specular reflection part based on the pixel values of the pixels included in the evaluation region Re. For example, if all of the pixel values of RGB are larger than predetermined threshold values, the correction unit 13 determines that the pixel is part of the specular reflection part. The correction unit 13 may specify the specular reflection part by converting the pixel values to HSV and carrying out similar threshold value processing with respect to brightness (V) or both of brightness (V) and saturation (S).

Then, the correction unit 13 removes the specular reflection from the specular reflection part to restore the original image information (pixel values). The correction unit 13 automatically interpolates (restores) the image information of the specular reflection part with the information of the image which is in the vicinity of the specular reflection part, for example, by a method using the Navier-Stokes equations and the fast marching method of Alexandru Telea. The correction unit 13 may restore the image information of the specular reflection part by learning images, which have various coverage values, in advance by machine learning. For example, generative adversarial network (GAN) is used for the machine learning. Note that the correction unit 13 may restore image information on a region expanded from an outer edge of the specular reflection part (in other words, a region which includes the specular reflection part and is larger than the specular reflection part).

Subsequently, the correction unit 13 removes noise from the evaluation region Re (step S26). The correction unit 13 removes noise from the evaluation region Re, for example, by using denoise filters (denoise function) such as a Gaussian filter and a low-pass filter.

Subsequently, the correction unit 13 carries out blur correction of the evaluation region Re (step S27). When the user captures an image by using the user terminal 10, blurs such as blurs caused by hand instability sometimes occur. The correction unit 13 carries out blur correction of the image, for example, by using a Wiener filter and the blind deconvolution algorithm.

Note that the correction processing of FIG. 5 is an example, and the correction processing carried out by the correction unit 13 is not limited thereto. Part or all of steps S21 and S23 to S27 may be omitted. Steps S21 to S27 may be carried out in an arbitrary order. In a case in which specular reflection removal is carried out after color correction as described above, the accuracy to specify specular reflection parts is improved since the specular reflection parts in an image appears to be intense white.

As shown in FIG. 7, the correction unit 13 may consider that the marker region Rm is formed of a plurality of blocks arranged like a matrix and obtain the vertex coordinates of each of blocks by using the coordinates of four vertices of the marker region Rm (marker MK). By virtue of this, the correction unit 13 can handle the marker region Rm as a plurality of divided blocks. For example, the correction unit 13 determines whether the marker region Rm is the image of the marker MK or not by using the blocks. Also, the correction unit 13 may use any of the blocks as the reference region which is used for color correction. Furthermore, the correction unit 13 may calculate the degree of distortion in the captured image from the coordinates of the blocks to carry out calibration of the image capture device 107.

Subsequently, the correction unit 13 outputs the captured image, which has been corrected by the correction processing of step S02, to the transmission unit 14 as the evaluation image, and the transmission unit 14 transmits the evaluation image to the evaluation device 20 via the network NW (step S03). In this process, the transmission unit 14 transmits, to the evaluation device 20, the evaluation image together with a terminal ID with which the user terminal 10 can be uniquely identified. For example, an internet protocol (IP) address may be used as the terminal ID. Then, the reception unit 21 receives the evaluation image, which has been transmitted from the user terminal 10, and outputs the evaluation image to the evaluation unit 22. If the evaluation image lacks clarity, the correction unit 13 does not have to output the evaluation image to the transmission unit 14. As described above, the transmission unit 14 may encrypt the evaluation image and transmit the encrypted evaluation image to the evaluation device 20. In such a case, the reception unit 21 receives the encrypted evaluation image from the user terminal 10, decrypts the encrypted evaluation image, and outputs the evaluation image to the evaluation unit 22.

Subsequently, the evaluation unit 22 evaluates the coverage of the evaluation target based on the evaluation image (step S04). In this example, the evaluation unit 22 evaluates the coverage of the evaluation target by using the neural network NN shown in FIG. 10. Note that, when the evaluation unit 22 receives the evaluation image, the evaluation unit 22 imparts an image ID, with which the evaluation image can be uniquely identified, to the evaluation image.

The neural network NN uses the evaluation image as an input and outputs the match rate of each of categories. As the categories, the values grouping the coverage in predetermined rate units can be used. For example, in a case in which the coverage is expressed by percentage, 0 to 98% are categorized by a 10% unit. Note that examples of the standard about the coverage include HS B2711 and SAE J2277. For example, in SAE J2277, the upper limit of measurable coverage is 98% (full coverage). The categories are not limited to the 10% unit, but may be set by a 5% unit or may be set by a 1% unit.

As shown in FIG. 11, in the present embodiment, the values which group the coverage of 0 to 98% by the 10% unit are used as the categories. In this example, for explanatory convenience, a category "100%" is used. The match rate expresses the probability that the coverage of the evaluation target belongs to that category. This means that the higher the match rate is, the possibility that the coverage of the evaluation target belongs to that category becomes higher.

The evaluation unit 22 may separate the evaluation image into one or a plurality of channels and use the image information (pixel values) of each channel as the input of the neural network NN. The evaluation unit 22, for example, separates the evaluation image into components of a color space. In a case in which an RGB color space is used as the color space, the evaluation unit 22 separates the evaluation image into the pixel values of R components, the pixel values of G components, and the pixel values of B components. In a case in which a HSV color space is used as the color space, the evaluation unit 22 separates the evaluation image into the pixel values of H components, the pixel values of S components, and the pixel values of V components. The evaluation unit 22 may convert the evaluation image to grayscale image and use the converted image as the input of the neural network NN.

As shown in FIG. 10, the neural network NN has an input layer L1, an intermediate layer L2, and an output layer L3. The input layer L1 is positioned at the entrance of the neural network NN, and M input values $x_i$ (i is an integer of 1 to M) are input to the input layer L1. The input layer L1 has a plurality of neurons 41. The neurons 41 are provided to correspond to the input values $x_i$, and the number of the neurons 41 is equal to the total number M of the input values $x_i$. In other words, the number of the neurons 41 is equal to the summation of the number of the pixels included in each channel of the evaluation image. The i-th neuron 41 outputs the input value $x_i$ to each of neurons 421 of a first intermediate layer L21 of the intermediate layer L2. The input layer L1 includes a node 41b. The node 41b outputs a bias value $b_j$ (j is an integer of 1 to M1) to each of the neurons 421.

The intermediate layer L2 is positioned between the input layer L1 and the output layer L3. The intermediate layer L2 is also referred to as a hidden layer since it is hidden from the outside of the neural network NN. The intermediate layer L2 includes one or a plurality of layers. In the example shown in FIG. 10, the intermediate layer L2 includes the first intermediate layer L21 and a second intermediate layer L22. The first intermediate layer L21 has the M1 neurons 421. In such a case, the j-th neuron 421 obtains a calculated value $z_j$ by further adding a bias value $b_j$ to the summation of the values, which are obtained by weighting each input value $x_i$ by a weight coefficient $w_{ij}$, as shown in Formula (1). Note that, if the neural network NN is a convolutional neural network, the neuron 421 carries out, for example, convolution, calculation using an activation function, and pooling sequentially. In such a case, for example, the ReLU function is used as the activation function.

[Formula 1]

$$z_j = \sum_{i=1}^{M} w_{ij} \times x_i + b_j \quad (1)$$

Then, the j-th neuron 421 outputs the calculated value $z_1$ to each of neurons 422 of the second intermediate layer L22. The first intermediate layer L21 includes a node 421b. The node 421b outputs a bias value to each of the neurons 422. Thereafter, each of the neurons carries out calculations like the neuron 421 and outputs a calculated value to each of the neurons of a subsequent level. The neurons (in this case, the neurons 422) of the final level of the intermediate layer L2 output the calculated values to each of neurons 43 of the output layer L3.

The output layer L3 is positioned at the exit of the neural network NN and outputs output values $y_k$ (k is an integer of 1 to N). The output value $y_k$ is allocated to each category and is the value corresponding to the match rate of the category. The output layer L3 has the plurality of neurons 43. The neurons 43 are provided to correspond to the output values $y_k$, and the number of the neurons 43 is equal to the total number N of the output values $y_k$. In other words, the number of the neurons 43 is equal to the number of the categories indicating the coverage. Each of the neurons 43 carries out calculations like the neuron 421 and calculates an activation function by using the calculation result thereof as an argument, thereby obtaining the output value $y_k$. Examples of the activation function include: a softmax function, a ReLU function, a hyperbolic function, a sigmoid function, an identity function, and a step function. In the present embodiment, a softmax function is used. Therefore, the output values $y_k$ are normalized so that the sum of the N output values $y_k$ becomes 1. In other words, the match rate (%) can be obtained by multiplying the output value $y_k$ by 100.

Subsequently, the evaluation unit 22 outputs, for example, the N output values $y_k$ together with the image ID of the evaluation image to the transmission unit 23 as an evaluation result of the evaluation image. The sequence of the N output values $y_k$ is determined in advance, and each of the output values $y_k$ is associated with any of the categories of the N categories. Note that the evaluation unit 22 may use the largest output value among the N output values $y_k$ together with a category name or an index (corresponding to "number" shown in FIG. 11) corresponding to the output value as an evaluation result. In this case, the sequence of the output values corresponding to the match rates shown in FIG. 11 is output to the transmission unit 23 as the evaluation result. In this case, the user terminal 10 can determine the manner of output to the user.

Then, the transmission unit 23 transmits the evaluation result to the user terminal 10 via the network NW (step S05). In this process, the transmission unit 23 identifies the user terminal 10 of the transmission destination based on the terminal ID, which has been transmitted from the user terminal 10 together with the evaluation image, and transmits the evaluation result to the user terminal 10. Then, the reception unit 15 receives the evaluation result, which has been transmitted from the evaluation device 20, and outputs the evaluation result to the output unit 16. Note that, as described above, the transmission unit 23 may encrypt the evaluation result and transmit the encrypted evaluation result to the user terminal 10. In such a case, the reception unit 15 receives the encrypted evaluation result from the evaluation device 20, decrypts the encrypted evaluation result, and outputs the evaluation result to the output unit 16.

Subsequently, the output unit 16 generates output information, which is for informing the user of the evaluation result, and outputs the evaluation result to the user based on the output information (step S06). The output unit 16 displays, for example, the name of the category (coverage oo %) having the highest match rate and the match rate thereof. Also, the output unit 16 may, for example, calculate coverage by totaling the results of multiplication of the value of each category by the match rate thereof and display the calculation result thereof as an evaluation result. In the example of FIG. 11, the coverage is 45% (=40%×0.5+50%× 0.5).

As shown in FIGS. 12(a) and 12(b), the output unit 16 may display the evaluation result of the coverage by using an arrow Pa in a graph. The output unit 16 may display the evaluation result by texts. For example, the output unit 16 displays "Result: coverage 45%" or the like. The output unit 16 may display the names of all the categories and the match rates thereof by texts.

The output unit 16 may inform the user whether the shot peening treatment is successful or not by using the evaluation result. The output unit 16 may output the evaluation result by sound or may output the evaluation result by vibrations. The form of output by the output unit 16 may be set by the user.

Subsequently, the corrected information acquisition unit 17 determines whether or not a correction operation of the evaluation result has been carried out by the user. For example, the user operates so as to display a screen for correcting the evaluation result by using the input device 105 after checking the evaluation result, which has been output by the output unit 16.

For example, as shown in FIGS. 13(a) and 13(b), the user specifies coverage on a graph by operating the input device 105 to move an arrow Pa by using a pointer MP. In other words, the user determines coverage by visually checking the evaluation target, and the user moves the arrow Pa so that the numerical value corresponding to the coverage determined by the user is indicated.

A text box may be used to specify the coverage by the user. Objects such as radio buttons, a drop down list, or sliders may be used for the user to select the category.

If the corrected information acquisition unit 17 determines that the correction operation has not been carried out, the series of processes of the evaluation method by the evaluation system 1 is finished. On the other hand, if it is determined that the correction operation has been carried out by the input device 105, the corrected information acquisition unit 17 acquires, as corrected information, the information indicating a corrected category together with the image ID of the evaluation image to which the correction operation has been carried out (step S07).

Then, the corrected information acquisition unit 17 outputs the corrected information to the transmission unit 14, and the transmission unit 14 transmits the corrected information to the evaluation device 20 via the network NW (step S08). Then, the reception unit 21 receives the corrected information transmitted from the user terminal 10 and outputs the corrected information to the evaluation unit 22. Note that, as described above, the transmission unit 14 may encrypt the corrected information and transmit the encrypted corrected information to the evaluation device 20. In such a case, the reception unit 21 receives the encrypted corrected information from the user terminal 10, decrypts the encrypted corrected information, and outputs the corrected information to the evaluation unit 22.

Subsequently, the evaluation unit 22 carries out learning based on the corrected information (step S09). Specifically, the evaluation unit 22 uses the set of the corrected category and the evaluation image as teaching data. The evaluation unit 22 may carry out learning of the neural network NN by any method of online learning, mini batch learning, and batch learning. The online learning is a method in which learning is carried out by using new teaching data every time new teaching data is acquired. The mini batch learning is a method in which learning is carried out by using one unit of teaching data, wherein a certain amount of teaching data serves as one unit. The batch learning is a method in which learning is carried out by using all teaching data. An algorithm such as back propagation is used in the learning. Note that the learning of the neural network NN means to update the weight coefficient and the bias value used in the neural network NN to more suitable values.

In the above described manner, the series of processes of the evaluation method by the evaluation system 1 is finished.

Note that the functional units of the user terminal 10 and the evaluation device 20 are realized by executing program modules, which are for realizing the functions, by computers, which constitute the user terminal 10 and the evaluation device 20. An evaluation program including these program modules are provided, for example, by a computer-readable recording medium such as a ROM or a semiconductor memory. The evaluation program may also be provided via a network as data signals.

In the evaluation system 1, the evaluation device 20, the evaluation method, the evaluation program, and the recording medium described above, the evaluation region Re is extracted from the captured image of the evaluation target, and the evaluation image is generated based on the evaluation region Re. Then, coverage is evaluated based on the evaluation image, and the evaluation result is output. The evaluation region Re is extracted from the captured image based on the size of the dent region De, which is the image of the dent formed on the evaluation target. Specifically, the evaluation region Re is extracted from the captured image so that the larger the dent region De is, (the area of) the evaluation region Re becomes larger. By virtue of this, the coverage is evaluated for the range corresponding to the size of the dent region De. Therefore, the influence of a single dent on the coverage can be reduced. As a result, the evaluation accuracy of the coverage can be improved.

More specifically, the size of the evaluation region Re is set by multiplying the size of the dent region De (for example, average diameter) by a constant, which is determined in advance. Therefore, the influence of a single dent on the coverage can be reduced since the range (area) of the evaluation region Re can be sufficiently increased with respect to the size of the dent region De. As a result, the evaluation accuracy of the coverage can be improved.

The evaluation region Re is expanded or contracted so as to adjust the size of the dent region De to a predetermined size (for example, reference grain diameter). Therefore, the evaluation by the neural network NN can be appropriately carried out. Moreover, the evaluation accuracy of the coverage can be improved since the coverage can be evaluated by a common standard with respect to the shot media having mutually different grain diameters.

Even if the evaluation target is the same, the color tone of the captured image sometimes changes depending on the color tone of a light source used to capture the image. Also, even if the evaluation target is the same, the brightness of the captured image is sometimes different depending on the irradiation amount of light. Therefore, the color of the evaluation region Re is corrected based on the color of the reference region (for example, the region Rw in the marker region Rm) included in the captured image. If the color of the region Rw in the marker region Rm is different from the color (white) of the region Rw in the marker MK, the color of the captured image is considered to be affected by the light. Therefore, the color of the evaluation region Re is corrected so that the color of the region Rw in the marker region Rm becomes the color of the region Rw in the marker MK. By virtue of this, the influence of light can be reduced. As a result, the evaluation accuracy of the coverage can be further improved.

If the evaluation target is irradiated with intense light, specular reflection sometimes occur; and, if an image of the evaluation target is captured in that state, over exposure sometimes occur in the captured image. In the region in which the over exposure occurs, color information is lost. Therefore, the color information can be restored by removing the specular reflection (over exposure) from the evaluation region Re. By virtue of this, the evaluation accuracy of the coverage can be further improved.

The coverage is evaluated by using the neural network NN. The pattern generated on the surface of the evaluation target by the shot peening treatment is irregular. Therefore, it is difficult to specify the position and state of the irregular-shaped object by a general object detection. Moreover, pattern recognition is not suitable for recognizing the countlessly existing patterns. On the other hand, by causing the neural network NN to learn, the coverage can be evaluated, and the evaluation accuracy of the coverage can be further improved.

Second Embodiment

Figure 14:
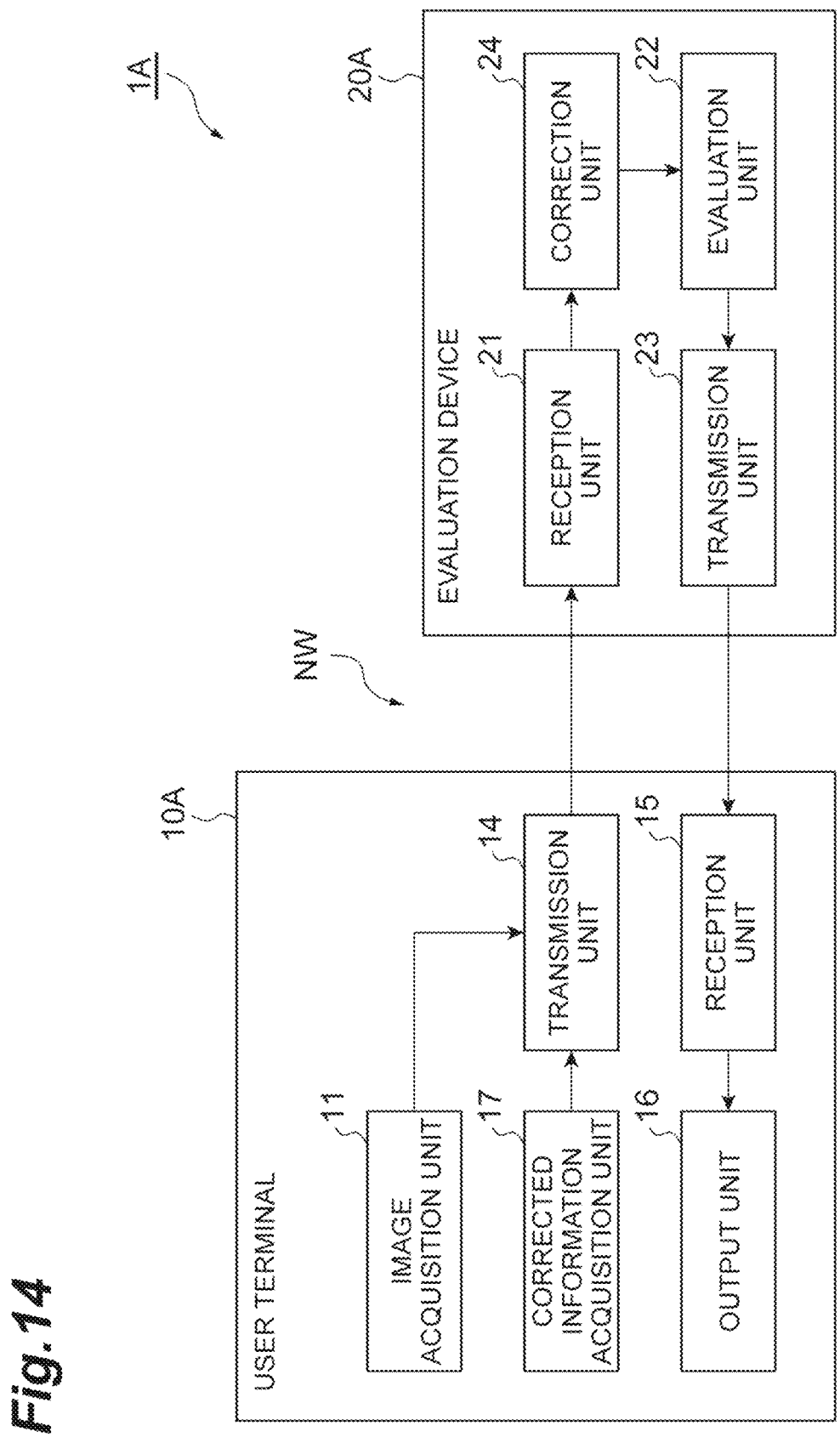
FIG. 14 is a configuration diagram schematically showing an evaluation system including an evaluation device according to a second embodiment.

FIG. 14 is a configuration diagram schematically showing an evaluation system including an evaluation device according to a second embodiment. The evaluation system 1A shown in FIG. 14 is different from the evaluation system 1 mainly in a point that the evaluation system 1A includes a user terminal 10A instead of the user terminal 10 and a point that the evaluation system 1A includes an evaluation device 20A instead of the evaluation device 20.

The user terminal 10A is different from the user terminal 10 mainly in a point that the user terminal 10A does not include the correction unit 13 and a point that the user terminal 10A transmits a captured image to the evaluation device 20A instead of the evaluation image. Note that, in the user terminal 10A, the image acquisition unit 11 outputs a captured image to the transmission unit 14. The transmission unit 14 transmits the captured image to the evaluation device 20A.

The evaluation device 20A is different from the evaluation device 20 mainly in a point that the evaluation device 20A receives the captured image from the user terminal 10A instead of the evaluation image and a point that the evaluation device 20A further includes a correction unit 24. The reception unit 21 receives the captured image from the user terminal 10A and outputs the captured image to the correction unit 24. Note that, the reception unit 21 can be considered as an image acquisition unit since it acquires the captured image from the user terminal 10A. The correction unit 24 has a function similar to that of the correction unit 13. More specifically, the correction unit 24 extracts an evaluation region from the captured image and generates the evaluation image based on the evaluation region. Then, the correction unit 24 outputs the evaluation image to the evaluation unit 22.

Figure 15:
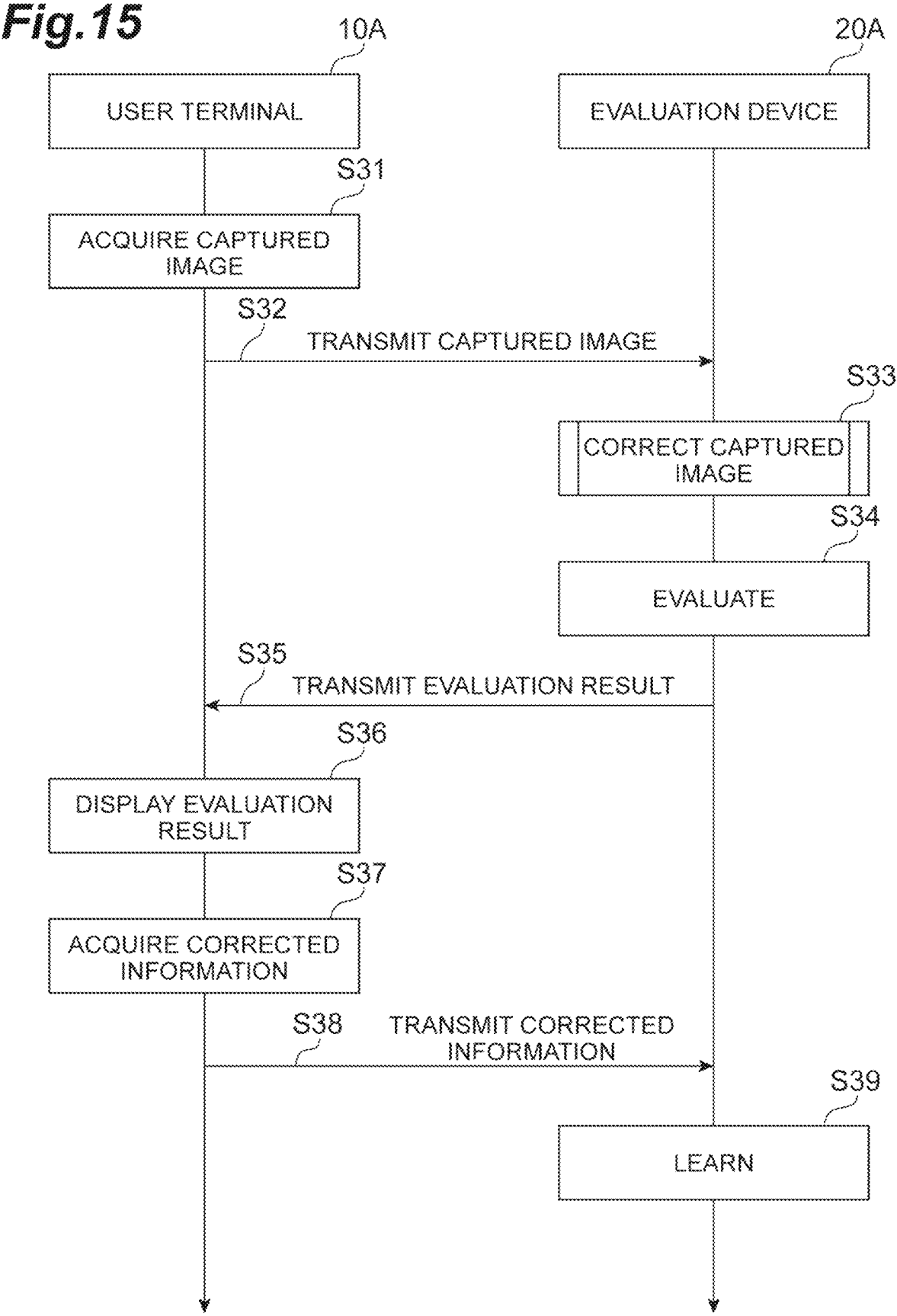
FIG. 15 is a sequence diagram showing an evaluation method carried out by the evaluation system shown in FIG. 14.

Next, with reference to FIG. 15, an evaluation method carried out by the evaluation system 1A will be described. FIG. 15 is a sequence diagram showing the evaluation method carried out by the evaluation system shown in FIG. 14. First, the image acquisition unit 11 acquires a captured image of an evaluation target (step S31). For example, as well as step S01, the image acquisition unit 11 acquires, as the captured image, an image of the evaluation target generated by the image capture device 107.

Then, the image acquisition unit 11 outputs the acquired captured image to the transmission unit 14, and the transmission unit 14 transmits the captured image to the evaluation device 20A via the network NW (step S32). In this process, the transmission unit 14 transmits, to the evaluation device 20A, the captured image together with a terminal ID with which the user terminal 10A can be uniquely identified. Then, the reception unit 21 receives the captured image, which has been transmitted from the user terminal 10A, and outputs the captured image to the correction unit 24. Note that, as described above, the transmission unit 14 may encrypt the captured image and transmit the encrypted captured image to the evaluation device 20A. In such a case, the reception unit 21 receives the encrypted captured image from the user terminal 10A, decrypts the encrypted captured image, and outputs the captured image to the correction unit 24.

Subsequently, the correction unit 24 corrects the captured image (step S33). Since the processing of step S33 is similar to the processing of step S02, detailed descriptions thereof will be omitted. The correction unit 24 outputs the captured image, which has been corrected by the correction processing of step S33, to the evaluation unit 22 as an evaluation image. Thereafter, the processing of step S34 to step S39 is similar to the processing of step S04 to step S09. Therefore, detailed descriptions thereof will be omitted. In the above described manner, the series of processes of the evaluation method by the evaluation system 1A is finished.

Note that the functional units of the user terminal 10A and the evaluation device 20A are realized by executing program modules, which are for realizing the functions, by computers, which constitute the user terminal 10A and the evaluation device 20A. An evaluation program including these program modules are provided, for example, by a computer-readable recording medium such as a ROM or a semiconductor memory. The evaluation program may also be provided via a network as data signals.

Also by the evaluation system 1A, the evaluation device 20A, the evaluation method, the evaluation program, and the recording medium according to the second embodiment, the effects similar to those of the evaluation system 1, the evaluation device 20, the evaluation method, the evaluation program, and the recording medium according to the first embodiment are exerted. Moreover, according to the evaluation system 1A, the evaluation device 20A, the evaluation method, the evaluation program, and the recording medium according to the second embodiment, the processing load of the user terminal 10A can be reduced since the user terminal 10A does not include the correction unit 13.

Third Embodiment

Figure 16:
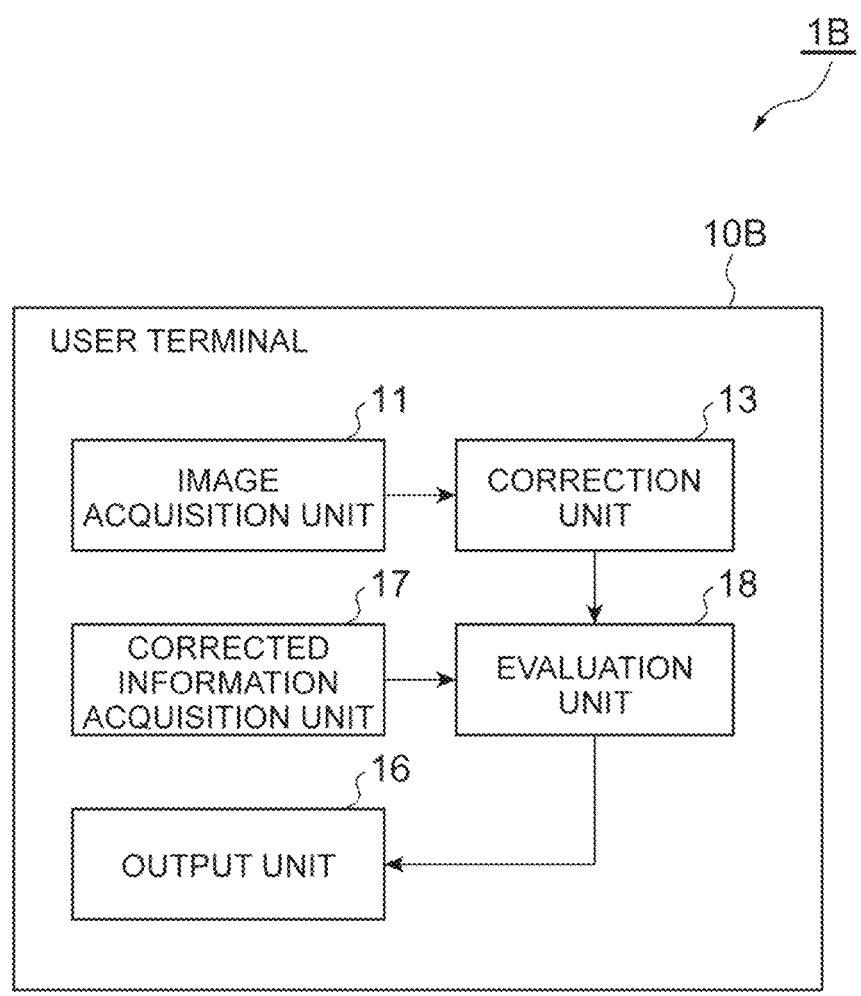
FIG. 16 is a configuration diagram schematically showing an evaluation system including an evaluation device according to a third embodiment.

FIG. 16 is a configuration diagram schematically showing an evaluation system including an evaluation device according to a third embodiment. The evaluation system 1B shown in FIG. 16 is different from the evaluation system 1 mainly in a point that the evaluation system 1B includes a user terminal 10B instead of the user terminal 10 and a point that the evaluation system 1B does not include the evaluation device 20. The user terminal 10B is different from the user terminal 10 mainly in a point that the user terminal 10B further includes an evaluation unit 18 and a point that the user terminal 10B does not include the transmission unit 14 and the reception unit 15. In this case, the user terminal 10B is also an evaluation device of a standalone type.

Note that, in the user terminal 10B, the correction unit 13 outputs the evaluation image to the evaluation unit 18. The corrected information acquisition unit 17 outputs the corrected information to the evaluation unit 18. The evaluation unit 18 has a function similar to that of the evaluation unit 22. More specifically, the evaluation unit 18 evaluates the coverage of the evaluation target based on the evaluation image. Then, the evaluation unit 18 outputs the evaluation result to the output unit 16.

Figure 17:
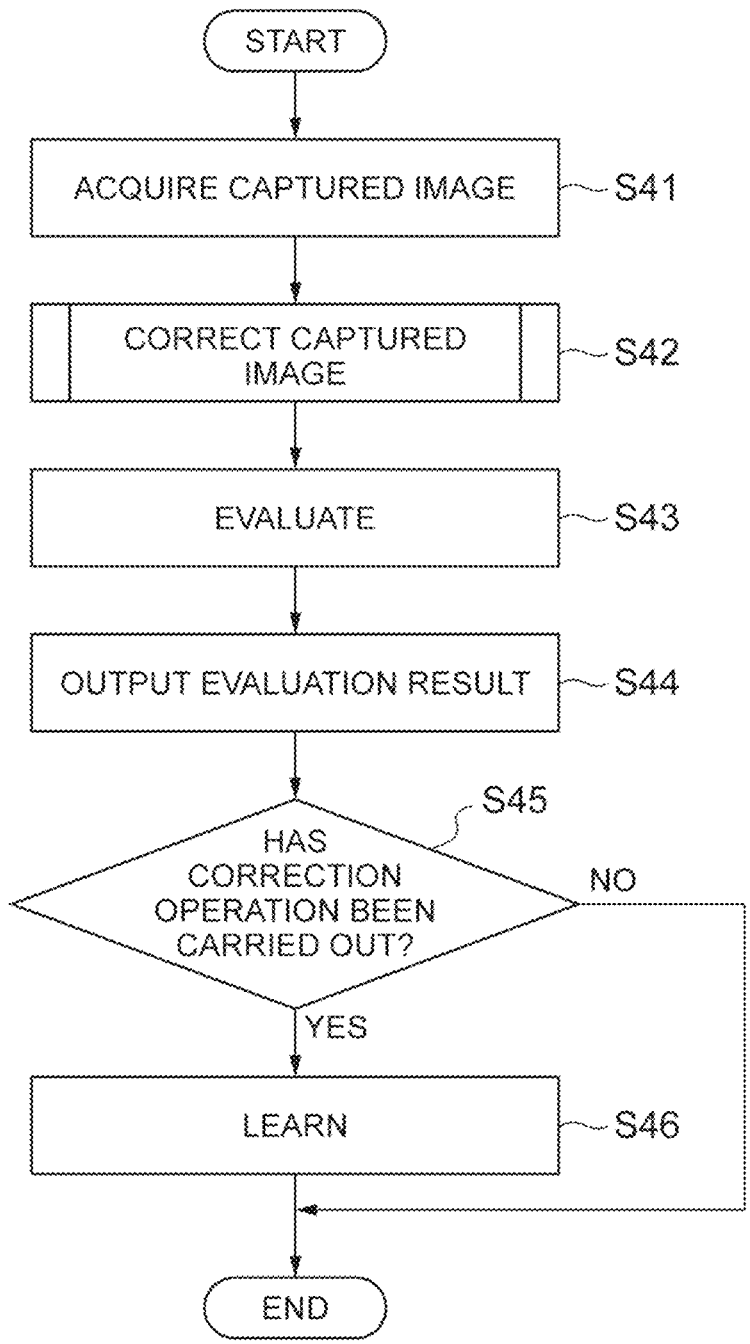
FIG. 17 is a flowchart showing an evaluation method carried out by the evaluation system shown in FIG. 16.

Next, with reference to FIG. 17, an evaluation method carried out by the evaluation system 1B (user terminal 10B) will be described. FIG. 17 is a flowchart showing the evaluation method carried out by the evaluation system shown in FIG. 16.

First, as well as step S01, the image acquisition unit 11 acquires a captured image of an evaluation target (step S41). Then, the image acquisition unit 11 outputs the captured image to the correction unit 13. Subsequently, the correction unit 13 corrects the captured image (step S42). Since the processing of step S42 is similar to the processing of step S02, detailed descriptions thereof will be omitted. Then, the correction unit 13 outputs the captured image, which has been corrected by the correction processing of step S42, to the evaluation unit 18 as an evaluation image.

Subsequently, the evaluation unit 18 evaluates the coverage of the evaluation target based on the evaluation image (step S43). Since the processing of step S43 is similar to the processing of step S04, detailed descriptions thereof will be omitted. Then, the evaluation unit 18 outputs the evaluation result to the output unit 16. Subsequently, the output unit 16 generates output information, which is for informing the user of the evaluation result, and outputs the evaluation result to the user based on the output information (step S44). Since the processing of step S44 is similar to the processing of step S06, detailed descriptions thereof will be omitted.

Subsequently, the corrected information acquisition unit 17 determines whether or not a correction operation of the evaluation result has been carried out by the user (step S45). If the corrected information acquisition unit 17 determines that the correction operation has not been carried out (step S45: NO), the series of processes of the evaluation method by the evaluation system 1B are finished. On the other hand, if it is determined that the correction operation has been carried out (step S45: YES), the corrected information acquisition unit 17 acquires, as corrected information, the information indicating a corrected category together with the image ID of the evaluation image to which the correction operation has been carried out. Then, the corrected information acquisition unit 17 outputs the corrected information to the evaluation unit 18.

Subsequently, the evaluation unit 18 carries out learning based on the corrected information (step S46). Since the processing of step S46 is similar to the processing of step S09, detailed descriptions thereof will be omitted. In the above described manner, the series of processes of the evaluation method by the evaluation system 1B are finished.

Note that the functional units of the user terminal 10B are realized by executing program modules, which are for realizing the functions, by a computer, which constitutes the user terminal 10B. An evaluation program including these program modules are provided, for example, by a computer-readable recording medium such as a ROM or a semiconductor memory. The evaluation program may also be provided via a network as data signals.

Also by the evaluation system 1B, the user terminal 10B, the evaluation method, the evaluation program, and the recording medium according to the third embodiment, the effects similar to those of the evaluation system 1, the evaluation device 20, the evaluation method, the evaluation program, and the recording medium according to the first embodiment are exerted. Moreover, according to the evaluation system 1B, the user terminal 10B, the evaluation method, the evaluation program, and the recording medium according to the third embodiment, since transmission and reception of data via the network NW does not have to be carried out, the time lag due to the communication via the network NW does not occur, and the speed of response can be improved. Moreover, the traffic and communication fee of the network NW can be reduced.

Note that the evaluation systems, the evaluation devices, the evaluation methods, the evaluation programs, and the recording medium according to the present disclosure are not limited to the above described embodiments.

For example, in a case in which the correction of the evaluation result by the user is not carried out, the user terminals 10, 10A, and 10B are not required to include the corrected information acquisition unit 17.

Also, in the neural network NN, batch normalization may be carried out. The batch normalization is processing to convert output values of layers so that dispersion becomes constant. In such a case, since there is no need to use the bias value, the nodes (for example, the node 41b and the node 421b), which output bias values, can be omitted.

Also, the evaluation units 18 and 22 may evaluate the coverage based on the evaluation image by using a method other than the neural network.

Also, the output unit 16 may output the evaluation result to a memory (storage device) not shown and save the evaluation result in the memory. The output unit 16, for example, creates management data, in which a management number capable of uniquely identifying the evaluation result, the date on which the evaluation is carried out, etc. are associated with the evaluation result, and saves the management data.

The shape of the marker MK is not limited to square. The shape of the marker MK may be rectangular.

Figure 18:
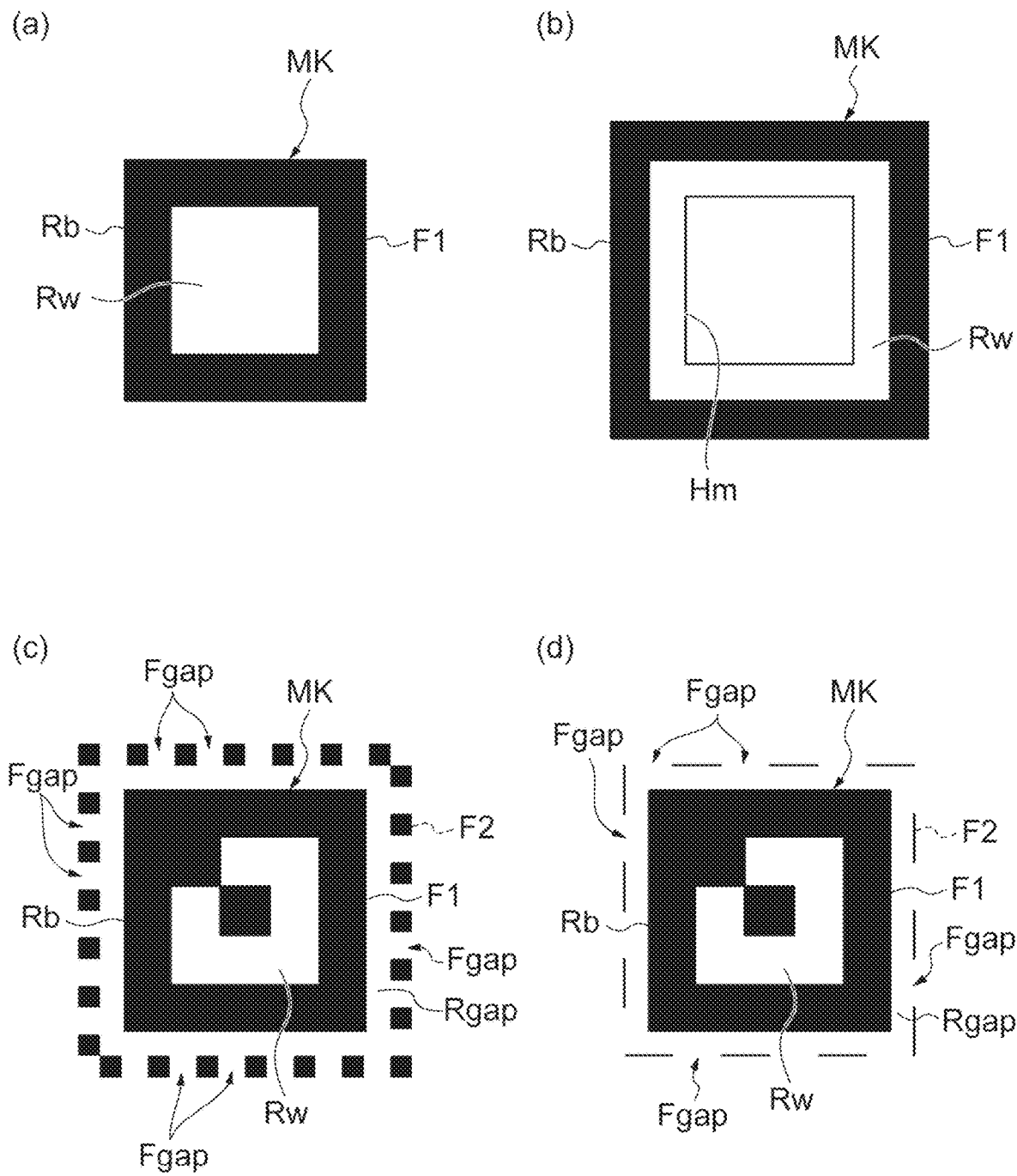
FIGS. 18(*a*) to 18(*d*) are diagrams showing modification examples of a marker.

In the above described embodiments, the marker MK has a shape with which the direction of the marker MK can be specified. However, the shape of the marker MK is not limited to the shape having directionality. The shape of the marker MK may be a non-directional shape. For example, as shown in FIG. 18(a), the shape of a region Rb may be square, and the shape of a region Rw may be a square slightly smaller than the region Rb. The regions may be disposed so that the center point of the region Rb and the center point of the region Rw are overlapped with each other and that the sides of the region Rb and the sides of the region Rw are parallel to each other. If the marker MK has a non-directional shape, creation of the marker MK can be simplified since the shape of the marker MK is simple. Moreover, since the direction of the marker MK is not important, the user can easily capture an image of the evaluation target.

As shown in FIG. 18(b), the marker MK may have an opening Hm. The opening Hm is a through hole, which penetrates through a sheet-like member on which the marker MK is drawn. The opening area of the opening Hm is sufficiently larger than the area of the evaluation region Re, which can be extracted. Therefore, the correction units 13, 24 may extract the region exposed via the opening Hm from the captured image as preprocessing of extraction of the evaluation region Re. Then, the correction units 13, 24 may extract the evaluation region Re from the extracted region based on the size of the dent region De included in the extracted region.

If the marker MK not surrounded by the frame F2 is used, the boundary between the marker region Rm and the region of the evaluation target sometimes becomes obscure due to reflection of light, etc. In such a case, an edge cannot be detected in the edge detection processing in some cases. In object detection, erroneous detection increases if a determination threshold value is too low, and missed detection increases if the determination threshold value is too high. Moreover, in the object detection per se, the direction (angle) of the marker region Rm cannot be obtained. Furthermore, in a case in which: the marker region Rm is extracted by object detection processing, then edge enhancement processing is carried out, and edge detection processing is further carried out, detection accuracy improves, but missed detection may occur if the color of the outer edge part of the marker region Rm and the color of the periphery of the marker region Rm are almost the same.

On the other hand, regarding the markers MK shown in FIGS. 6(b) to 6(f) and FIGS. 18(c) and 18(d), the marker MK is surrounded by the frame F2, and the gap Rgap is provided between the frame F2 and the region Rb. The gap Rgap surrounds the region Rb along the edge F1. The color of the gap Rgap is different from the color of the outer edge part (more specifically, the region Rb) of the marker MK. Therefore, even if the color of the periphery (outside of the frame F2) of the marker region Rm is similar to the color of the outer edge part (region Rb) of the marker region Rm, the outer edge of the marker region Rm can be detected since the outer edge (edge F1) of the marker region Rm is clear. For example, in a case in which: the marker region Rm is extracted in object detection processing, edge enhancement processing is then carried out, and edge detection processing is further carried out, the vertexes (vertexes Pm1 to Pm4) of the region Rb can be more reliably detected. Therefore, the marker region Rm can be extracted at high speed with high accuracy. As a result, the evaluation accuracy of the coverage can be further improved. Note that the distance (the width of the gap Rgap) between the frame F2 and the region Rb may be equal to or more than one tenth of one side of the marker MK, for example, in order to ensure the gap Rgap. The distance (the width of the gap Rgap) between the frame F2 and the region Rb may be equal to or less than half of one side of the marker MK, for example, in consideration of usability of the marker MK.

Meanwhile, as shown in FIGS. 18(c) and 18(d), the frame F2 is not required to be a frame which completely surrounds the marker MK. In other words, the frame F2 may be provided with a noncontinuous part(s) Fgap. For example, the frame F2 is not limited to a solid line, but may be a broken line. In such a case, the frame F2 has a shape in which the frame line of the frame F2 is interrupted in the middle. If the frame F2 is provided with the noncontinuous parts Fgap, detection accuracy of the marker region Rm improves since the possibility that the region surrounded by the frame F2 is detected as the marker region Rm in the edge detection processing, etc. can be reduced. In other words, the vertexes of the marker region Rm (region Rb) can be more reliably detected since the possibility that the vertexes of the frame F2 are detected can be reduced. As a result, the evaluation accuracy of the coverage can be further improved.

Figure 19:
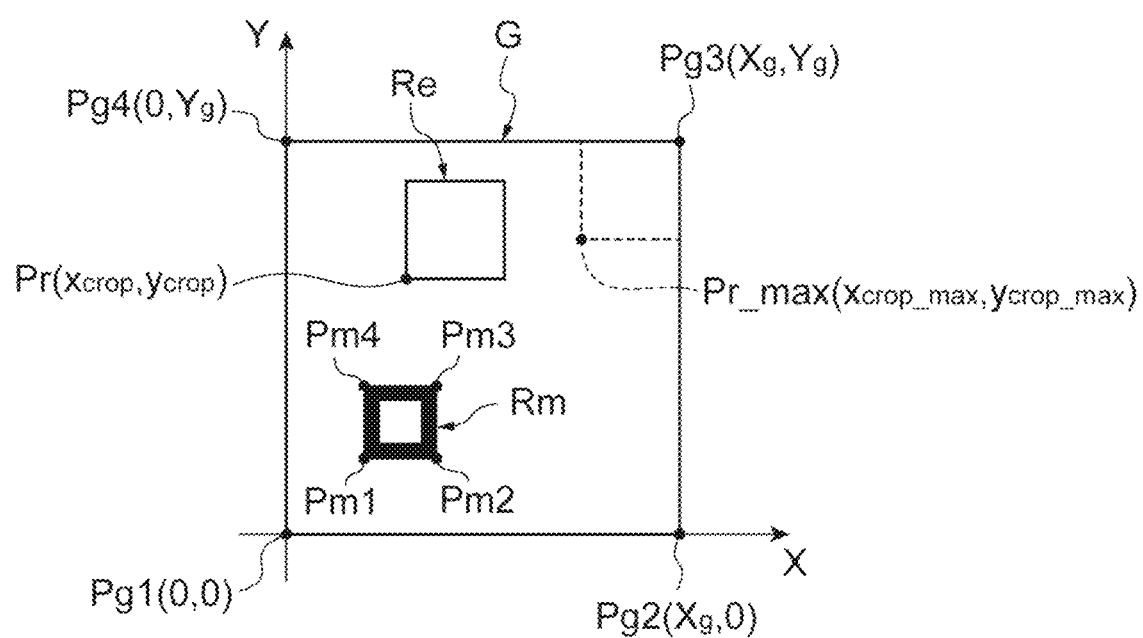
FIG. 19 is a diagram for describing a modification example of an extraction method of the evaluation region.

As shown in FIG. 19, when the evaluation region Re having the size set based on the dent region De is to be extracted from the captured image G, the correction units 13, 24 may randomly determine the evaluation region Re in the captured image G and extract the determined evaluation region Re therefrom. In such a case, first, the correction units 13, 24 obtain the maximum values of the coordinate, which is possible for a reference point Pr of the evaluation region Re. The reference point Pr is one of the four vertexes of the evaluation region Re and, in this case, is the vertex which is the closest to the origin of X-Y coordinate among the four vertexes of the evaluation region Re. For example, if the length of one side of the evaluation region Re is 100 pixels, the X-coordinate maximum value $x_{crop\_max}$ and the Y-coordinate maximum value $y_{crop\_max}$ of the reference point Pr are expressed by following Formula (2). Note that a vertex Pg1 of the captured image G is positioned at the origin (0, 0), a vertex Pg2 is positioned at ($X_g$, 0), a vertex Pg3 is positioned at ($X_g$, $Y_g$), and a vertex Pg4 is positioned at (0, $Y_g$).

[Formula 2]

$$(x_{crop\_max}, y_{crop\_max}) = (X_g - 100, Y_g - 100) \quad (2)$$

The correction units 13, 24 randomly determine the coordinate ($x_{crop}$, $y_{crop}$) of the reference point of the evaluation region Re by using Formula (3). Note that the function random (minimum value, maximum value) is a function which returns an arbitrary value included in the range from the minimum value to the maximum value.

[Formula 3]

$$x_{crop}, y_{crop} = (\text{random}(0, x_{crop\_max}), \text{random}(0, y_{crop\_max})) \quad (3)$$

If the deter mined evaluation region Re and the marker region Rm are overlapped with each other, the correction units 13, 24 may determine the coordinate of the reference point of the evaluation region Re again.

Figure 20:
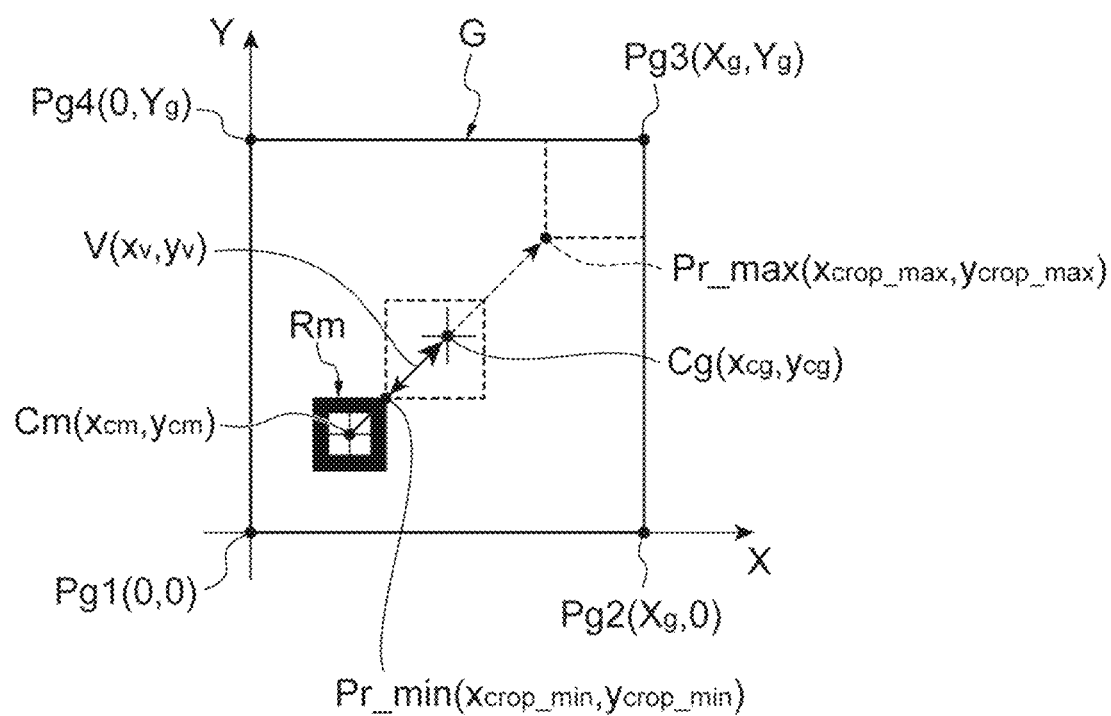
FIG. 20 is a diagram for describing a modification example of an extraction method of the evaluation region.

As shown in FIG. 20, the correction units 13, 24 may extract the evaluation region Re from the captured image G by specifying an extracting direction with respect to the marker region Rm. In such a case, first, the correction units 13, 24 calculate the coordinate ($x_{cg}$, $y_{cg}$) of a center position Cg of the captured image G and the coordinate ($x_{cm}$, $y_{cm}$) of a center position Cm of the marker region Rm. Then, the correction units 13, 24 calculate a vector V, which is from the center position Cm to the center position Cg, as shown in Formula (4).

[Formula 4]

$$V = (x_{cg} - x_{cm}, y_{cg} - y_{cm}) = (x_v, y_v) \quad (4)$$

The correction units 13, 24 determine the position of the evaluation region Re in the direction indicated by the vector V from the marker region Rm. The correction units 13, 24 determine the position of the evaluation region Re, for example, so that the reference point Pr of the evaluation region Re is positioned in the direction indicated by the vector V from the center position Cm. In this case, the reference point Pr is the vertex closest to the marker region Rm among the four vertexes of the evaluation region Re. The correction units 13, 24 determine the position of the evaluation region Re, for example, so that the evaluation region Re is not overlapped with the marker region Rm. Specifically, the correction units 13, 24 calculate the coordinate ($x_{crop\_max}$, $y_{crop\_max}$) of a reference point Pr_max farthest from the marker region Rm among the possible coordinates of the reference point Pr, and the coordinate ($x_{crop\_min}$, $y_{crop\_min}$) of a reference point Pr_min closest to the marker region Rm among them. Then, the correction units 13, 24 determine the position of the evaluation region Re so that the reference point Pr is positioned on the line segment between these two points.

REFERENCE SIGNS LIST 1, 1A, 1B Evaluation system
10, 10A, 10B User terminal
11 Image acquisition unit
13, 24 Correction unit
16 Output unit
17 Corrected information acquisition unit
18, 22 Evaluation unit
20, 20A Evaluation device
21 Reception unit (Image acquisition unit)
23 Transmission unit (output unit)
De Dent region
G Captured image
NN Neural network
Re Evaluation region

The invention claimed is:

1. An evaluation system configured to evaluate coverage of an evaluation target that has been subjected to a shot peening treatment with shot media by using a captured image of the evaluation target, the evaluation system comprising:
a data storage device that stores instructions; and
at least one processor configured to execute the instructions to perform a method including:
acquiring the captured image including a plurality of dent regions, each dent region of the plurality of dent regions is an image of a dent formed on the evaluation target by the shot media of the shot peening treatment, the captured image being image data including a plurality of pixels;
generating an evaluation image by correcting the captured image including:
extracting an evaluation region from the captured image based on an average size of the plurality of dent regions included in the captured image,
expanding or contracting the extracted evaluation region by adjusting pixels of the extracted evaluation region so as to adjust the average size of the dent regions to a predetermined size, and
generating the evaluation image based on the expanded or contracted evaluation region;
evaluating the coverage based on the evaluation image, the coverage is an index of a finishing degree of the shot peening treatment, and the coverage is a rate of the area of the dent regions with respect to the total surface area of the evaluation target; and
outputting an evaluation result of the coverage.

2. The evaluation system according to claim 1, wherein an initial size of the evaluation region extracted from the captured image is set in proportion to the size of the dent region included in the captured image.

3. The evaluation system according to claim 2, wherein generating the evaluation image by correcting the captured image further includes:
setting the initial size of the evaluation region by multiplying the size of the dent region included in the captured image by a constant determined in advance and extracting the evaluation region from the captured image.

4. The evaluation system according to claim 2, wherein generating the evaluation image by correcting the captured image further includes:
correcting a color of the evaluation region based on a color of a reference region included in the captured image, and
the reference region is an image of a reference having a specific color.

5. The evaluation system according to claim 2, wherein generating the evaluation image by correcting the captured image further includes:
removing specular reflection from the evaluation region.

6. The evaluation system according to claim 3, wherein generating the evaluation image by correcting the captured image further includes:
correcting a color of the evaluation region based on a color of a reference region included in the captured image, and
the reference region is an image of a reference having a specific color.

7. The evaluation system according to claim 3, wherein generating the evaluation image by correcting the captured image further includes:
removing specular reflection from the evaluation region.

8. The evaluation system according to claim 1, wherein generating the evaluation image by correcting the captured image further includes:
correcting a color of the evaluation region based on a color of a reference region included in the captured image, and
the reference region is an image of a reference having a specific color.

9. The evaluation system according to claim 8, wherein generating the evaluation image by correcting the captured image further includes:
removing specular reflection from the evaluation region.

10. The evaluation system according to claim 1, wherein generating the evaluation image by correcting the captured image further includes:
removing specular reflection from the evaluation region.

11. The evaluation system according to claim 1, wherein evaluating the coverage based on the evaluation image includes:
evaluating the coverage by using a neural network.

12. A non-transitory computer-readable storage device storing instructions that, when executed by a computer, cause the computer to perform a method for evaluating coverage of an evaluation target that has been subjected to a shot peening treatment with shot media by using a captured image of the evaluation target, the method including:
acquiring the captured image including a plurality of dent regions, each dent region of the plurality of dent regions is an image of a dent formed on the evaluation target by the shot media of the shot peening treatment, the captured image being image data including a plurality of pixels;
generating an evaluation image by correcting the captured image including:
extracting an evaluation region from the captured image based on an average size of the plurality of dent regions included in the captured image, expanding or contracting the extracted evaluation region by adjusting pixels of the extracted evaluation region so as to adjust the average size of the dent regions to a predetermined size, and generating the evaluation image based on the expanded or contracted evaluation region;

evaluating the coverage based on the evaluation image, the coverage is an index of a finishing degree of the shot peening treatment, and the coverage is a rate of the area of the dent regions with respect to the total surface area of the evaluation target; and outputting an evaluation result of the coverage.

13. An evaluation method of evaluating coverage of an evaluation target that has been subjected to a shot peening treatment with shot media by using a captured image of the evaluation target, the evaluation method comprising:

a step of acquiring the captured image including a plurality of dent regions, each dent region of the plurality of dent regions is an image of a dent formed on the evaluation target by the shot media of the shot peening treatment, the captured image being image data including a plurality of pixels;

a step of generating an evaluation image by correcting the captured image including:

extracting an evaluation region from the captured image based on an average size of the plurality of dent regions included in the captured image, expanding or contracting the extracted evaluation region by adjusting pixels of the extracted evaluation region so as to adjust the average size of the dent regions to a predetermined size, and generating the evaluation image based on the expanded or contracted evaluation region;

a step of evaluating the coverage based on the evaluation image, the coverage is an index of a finishing degree of the shot peening treatment, and the coverage is a rate of the area of the dent regions with respect to the total surface area of the evaluation target; and a step of outputting a result of the evaluation carried out in the step of evaluating the coverage.

14. An evaluation system configured to evaluate coverage of an evaluation target that has been subjected to a shot peening treatment with shot media by using a captured image of the evaluation target, the evaluation system comprising:

a data storage device that stores instructions; and at least one processor configured to execute the instructions to perform a method including:

acquiring the captured image including a plurality of dent regions, each dent region of the plurality of dent regions is an image of a dent formed on the evaluation target by the shot media of the shot peening treatment, the captured image being image data including a plurality of pixels;

generating an evaluation image by correcting the captured image including:

extracting an evaluation region from the captured image based on an average size of the plurality of dent regions included in the captured image, correcting a color of the extracted evaluation region by adjusting pixels of the extracted evaluation region based on a color of a reference region included in the captured image, the reference region is an image of a reference having a specific color, and generating the evaluation image based on the corrected evaluation region, evaluating the coverage based on the evaluation image, the coverage is an index of a finishing degree of the shot peening treatment, and the coverage is a rate of the area of the dent regions with respect to the total surface area of the evaluation target; and outputting an evaluation result of the coverage.

* * * * *